(12) United States Patent
Kinomura et al.

(10) Patent No.: US 9,473,037 B2
(45) Date of Patent: Oct. 18, 2016

(54) MATRIX CONVERTER

(71) Applicant: KABUSHIKI KAISHA YASKAWA DENKI, Kitayushu-shi (JP)

(72) Inventors: Hirofumi Kinomura, Kitayushu (JP); Joji Ebisu, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 92 days.

(21) Appl. No.: 14/497,232

(22) Filed: Sep. 25, 2014

(65) Prior Publication Data
US 2015/0085553 A1    Mar. 26, 2015

(30) Foreign Application Priority Data

Sep. 26, 2013  (JP) ................................. 2013-199797

(51) Int. Cl.
*H02M 5/293* (2006.01)
*H02M 5/297* (2006.01)

(52) U.S. Cl.
CPC ............. *H02M 5/293* (2013.01); *H02M 5/297* (2013.01); *H02M 2005/2932* (2013.01)

(58) Field of Classification Search
CPC ..................... H02M 2005/2932; H02M 5/293; H02M 5/297
See application file for complete search history.

(56) References Cited

U.S. PATENT DOCUMENTS

| 5,594,636 | A * | 1/1997 | Schauder | H02M 5/297 363/159 |
| 6,744,650 | B2 * | 6/2004 | Mahlein | H02M 5/271 363/148 |
| 2007/0217243 | A1 * | 9/2007 | Yamamoto | H02M 5/297 363/160 |
| 2010/0118570 | A1 * | 5/2010 | Hara | H02M 5/297 363/74 |
| 2012/0287686 | A1 * | 11/2012 | Yamamoto | H02M 5/297 363/78 |

FOREIGN PATENT DOCUMENTS

| JP | 2003-333851 | 11/2003 |
| JP | 2005-168197 | 6/2005 |
| JP | 2008-048535 | 2/2008 |
| JP | 2010-246174 | 10/2010 |

OTHER PUBLICATIONS

Kato et al., "Development of a Novel Commutation Method which Drastically Suppresses Commutation Failure of a Matrix Converter", 2007, pp. 829-836, vol. 127, No. 8, URL: http://itohserver01.nagaokaut.ac.jp/itohlab/paper/2007/trans_2007_8/kato.pdf.
Japanese Office Action for corresponding JP Application No. 2013-199797, Sep. 1, 2015.
Chinese Office Action for corresponding CN Application No. 201410433473.0, Jul. 6, 2016.

* cited by examiner

*Primary Examiner* — Jessica Han
*Assistant Examiner* — Bart Iliya
(74) *Attorney, Agent, or Firm* — Mori & Ward, LLP

(57) ABSTRACT

A matrix converter includes: a power convertor that includes a plurality of bidirectional switches; and a controller configured to control the plurality of bidirectional switches. The controller includes: a first commutation controller configured to perform a commutation control with a first commutation method; a second commutation controller configured to perform a commutation control with a second commutation method different from the first commutation method; and a selector configured to select a commutation controller that is configured to execute a commutation control from the first commutation controller and the second commutation controller based on any one of a phase of an output electric current from the power convertor and a phase of an input voltage to the power convertor.

10 Claims, 24 Drawing Sheets

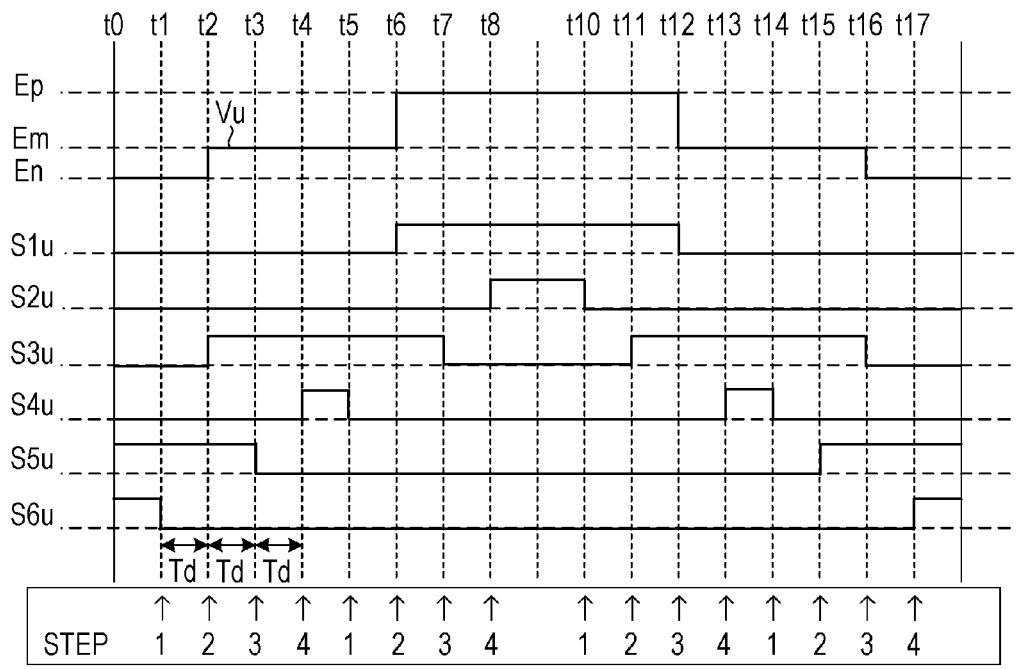
FIG. 6A  CASE WHERE Iu > 0
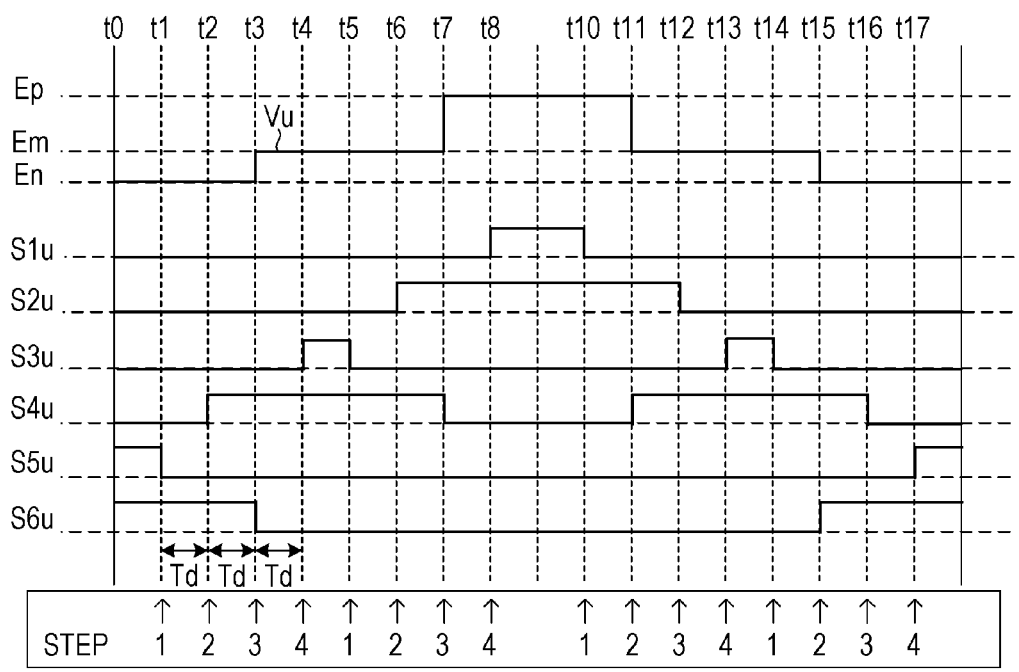
FIG. 6B  CASE WHERE Iu < 0

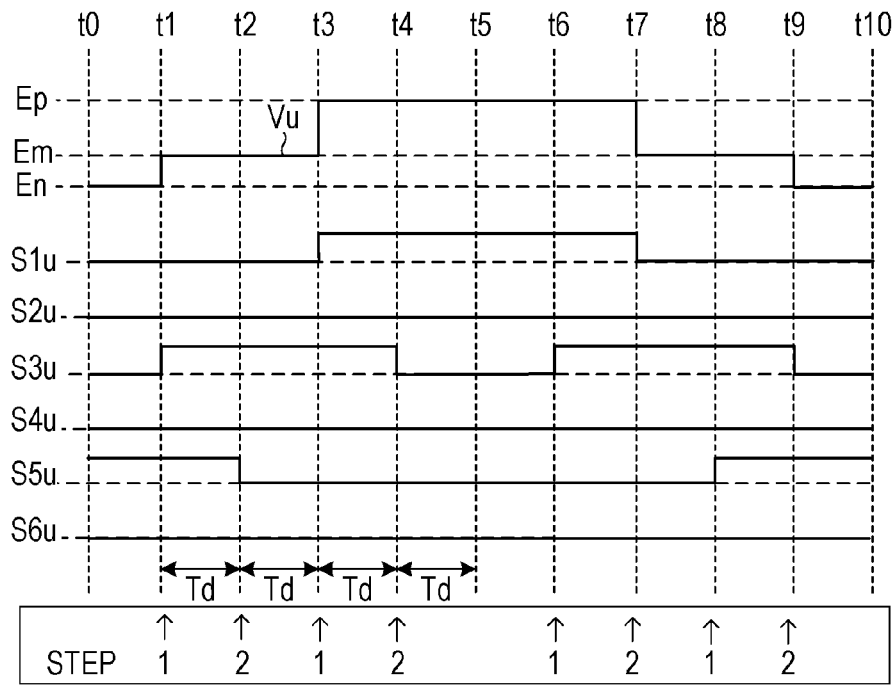
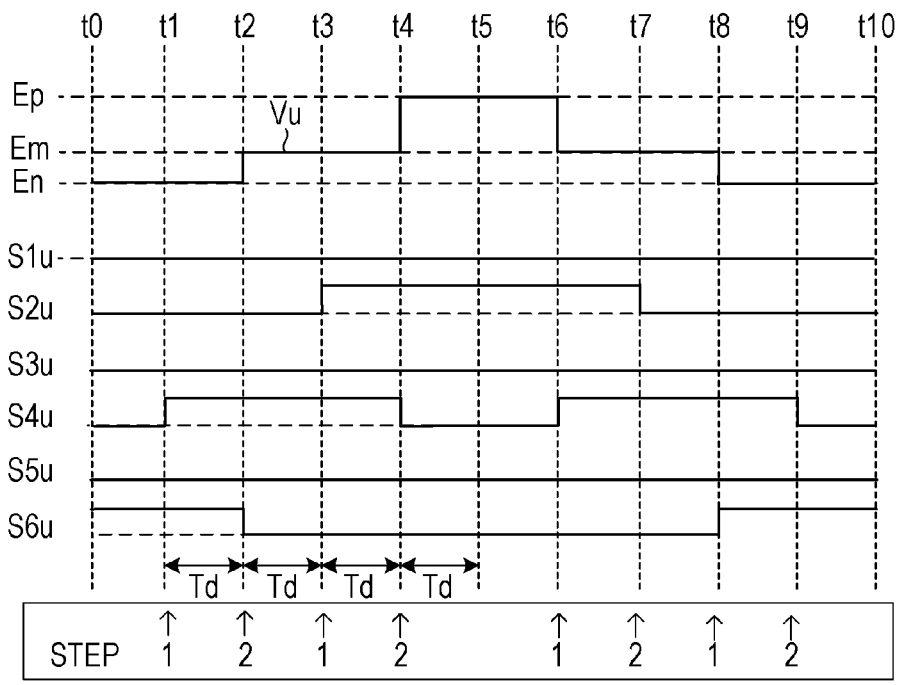

MATRIX CONVERTER

CROSS-REFERENCE TO RELATED APPLICATION

This application claims priority from Japanese Patent Application No. 2013-199797 filed with the Japan Patent Office on Sep. 26, 2013, the entire content of which is hereby incorporated by reference.

BACKGROUND

1. Technical Field

The embodiment of the disclosure relates to a matrix converter.

2. Related Art

A matrix converter includes a plurality of bidirectional switches that couple an AC power supply and a load together. Directly switching respective phase voltages of the AC power supply by controlling these bidirectional switches causes the output of an AC power with any voltage and frequency to the load.

In this matrix converter, the bidirectional switch switches the phase of the AC power supply to be coupled to the load. During this switching, a commutation operation that individually controls switching elements constituting the bidirectional switch in a predetermined order is performed. This suppresses a short circuit between phases for the input phase, circuit opening of the output phase, and similar trouble.

As a method of this commutation operation, a current commutation method and a voltage commutation method are known. In the current commutation method, for example, when there is a delay of polarity switching or a detection error of the electric current in the case where the output electric current is small, commutation failure such as circuit opening of the output phase might occur. In the voltage commutation method, for example, when there is a delay of switching of the magnitude relationship between the input phase voltages or a detection error of the voltage in the case where the difference in magnitude of the input phase voltages is small, commutation failure such as a short circuit between phases for the input phase might occur.

Thus, there has been proposed a technique that performs switching from the current commutation method to the voltage commutation method or switching reversed with respect to this switching in the case where the absolute value of the output electric current is small and in the case where the difference in absolute value of the input phase voltages is small, so as to perform the commutation operation (for example, see JP-A-2003-333851).

SUMMARY

A matrix converter includes: a power convertor that includes a plurality of bidirectional switches disposed between a plurality of input terminals and a plurality of output terminals, the input terminals being to be coupled to respective phases of an AC power supply, the output terminals being to be coupled to respective phases of a load, the bidirectional switch being configured to control a conducting direction using a plurality of switching elements; and a controller configured to control the plurality of bidirectional switches. The controller includes: a first commutation controller configured to perform a commutation control with a first commutation method; a second commutation controller configured to perform a commutation control with a second commutation method different from the first commutation method; and a selector configured to select a commutation controller that is configured to execute a commutation control from the first commutation controller and the second commutation controller based on any one of a phase of an output electric current from the power convertor and a phase of an input voltage to the power convertor.

BRIEF DESCRIPTION OF DRAWINGS

FIG. 6A is a diagram illustrating a relationship between an output phase voltage and gate signals in the case where an output-phase electric current is positive in a four-step current commutation method;

FIG. 6B is a diagram illustrating a relationship between the output phase voltage and the gate signals in the case where the output-phase electric current is negative in the four-step current commutation method;

FIG. 16A is a diagram illustrating a relationship between the output phase voltage and the gate signals in the case where the output-phase electric current is positive in a two-step current commutation method;

FIG. 16B is a diagram illustrating a relationship between the output phase voltage and the gate signals in the case where the output-phase electric current is negative in the two-step current commutation method;

DETAILED DESCRIPTION

Figure 1:
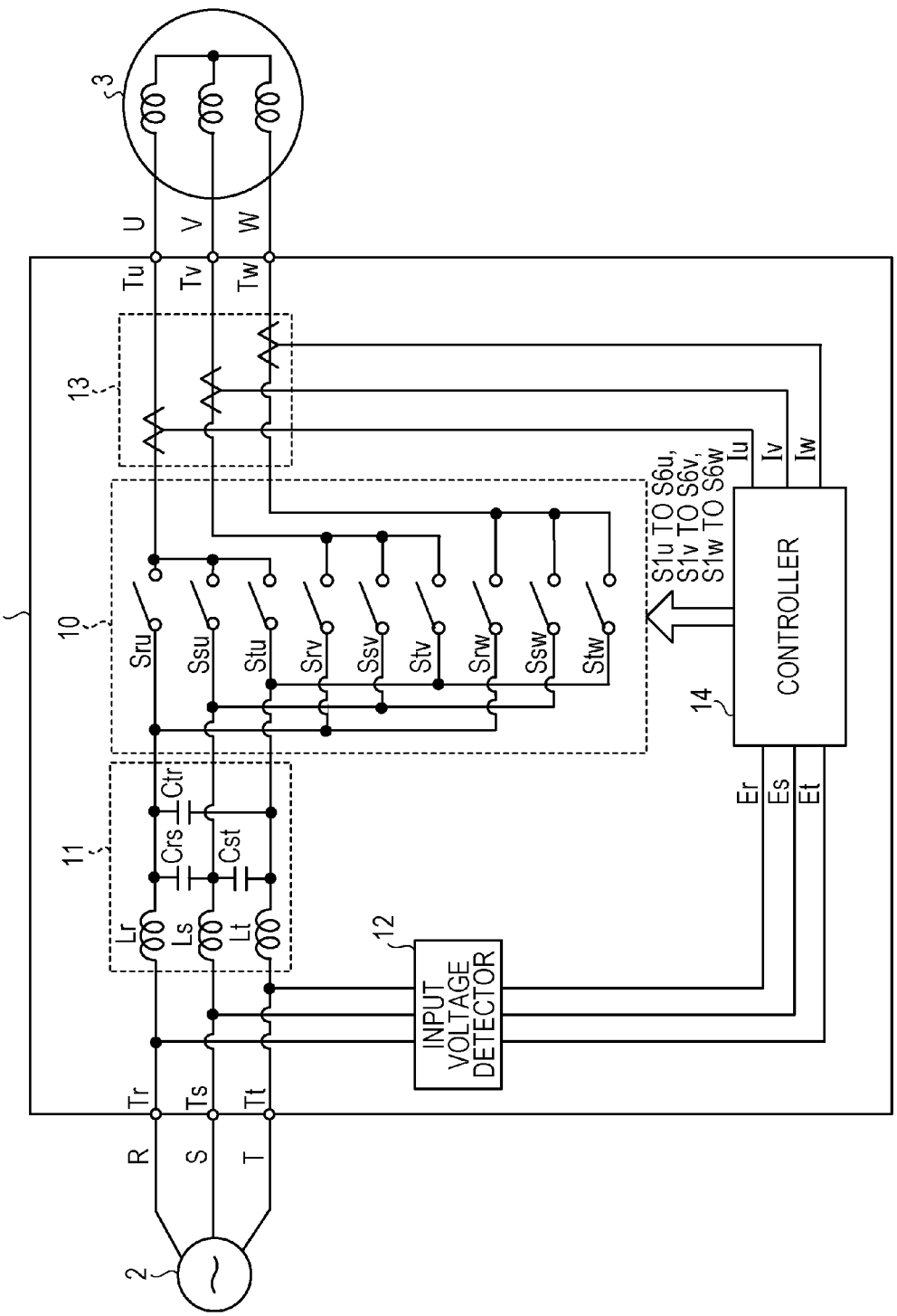
FIG. 1 is a diagram illustrating an exemplary configuration of a matrix converter according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A matrix converter according to one aspect of the embodiment includes a power converter and a controller. The power converter includes a plurality of bidirectional switches configured to control a conducting direction using a plurality of switching elements, and disposed between: a plurality of input terminals to be coupled to respective phases of an AC power supply; and a plurality of output terminals to be coupled to respective phases of a load. The controller is configured to control the plurality of bidirectional switches. The controller includes a first commutation controller, a second commutation controller, and a selector. The first commutation controller is configured to perform a commutation control with a first commutation method. The second commutation controller is configured to perform a commutation control with a second commutation method different from the first commutation method. The selector is configured to select a commutation controller that is configured to execute a commutation control from the first commutation controller and the second commutation controller based on any one of a phase of an output electric current from the power convertor and a phase of an input voltage to the power convertor.

One aspect of the embodiment allows providing a matrix converter that can accurately perform switching of the commutation method.

The following describes the embodiments of a matrix converter disclosed in this application in detail with reference to the accompanying drawings. Here, the following embodiments do not limit the content of this disclosure.

(1. First Embodiment)
(1.1. Configuration of Matrix Converter)

FIG. 1 is a diagram illustrating an exemplary configuration of the matrix converter according to a first embodiment. As illustrated in FIG. 1, a matrix converter 1 according to the first embodiment is disposed between a three-phase AC power supply 2 (hereinafter referred to simply as the AC power supply 2) and a load 3. The load 3 is, for example, an AC electric motor. In the following description, an R-phase, an S-phase, and a T-phase of the AC power supply 2 are described as input phases while a U-phase, a V-phase, and a W-phase of the load 3 are described as output phases.

The matrix converter 1 includes input terminals Tr, Ts, and Tt, output terminals Tu, Tv, and Tw, a power converter 10, an LC filter 11, an input voltage detector 12, an output electric current detector 13, and a controller 14. The matrix converter 1 converts a three-phase power to be supplied from the AC power supply 2 through the input terminals Tr, Ts, and Tt into a three-phase power with any voltage and frequency, and outputs this power to the load 3 from the output terminals Tu, Tv, and Tw.

The power converter 10 includes a plurality of bidirectional switches Sru, Ssu, Stu, Srv, Ssv, Stv, Srw, Ssw, and Stw (hereinafter referred to collectively as a bidirectional switch S in some cases) that couple the phases of the AC power supply 2 to the respective phases of the load 3.

The bidirectional switches Sru, Ssu, and Stu couple the respective R-phase, S-phase, and T-phase of the AC power supply 2 to the U-phase of the load 3. The bidirectional switches Srv, Ssv, and Stv couple the respective R-phase, S-phase, and T-phase of the AC power supply 2 to the V-phase of the load 3. The bidirectional switches Srw, Ssw, and Stw couple the respective R-phase, S-phase, and T-phase of the AC power supply 2 to the W-phase of the load 3.

Figure 2:
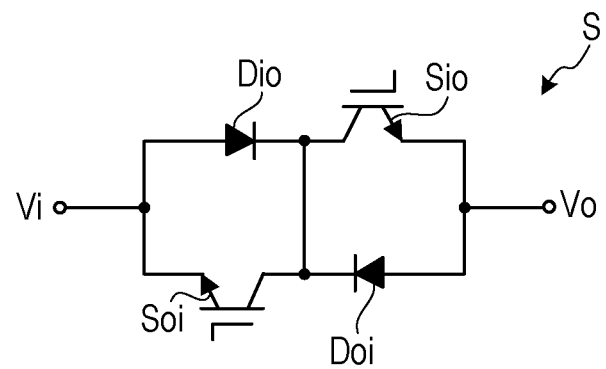
FIG. 2 is a diagram illustrating an exemplary configuration of a bidirectional switch illustrated in FIG. 1.

FIG. 2 is a diagram illustrating an exemplary configuration of the bidirectional switch S. As illustrated in FIG. 2, the bidirectional switch S includes a circuit in which a uni-directional switch Sio and a diode Dio are coupled together in series and a circuit in which a uni-directional switch Soi and a diode Doi are coupled together in series. These series-coupled circuits are coupled in inverse-parallel to each other. Here, the bidirectional switch S only needs to include a plurality of uni-directional switches and to be configured to control the conducting direction, and is not limited to the configuration illustrated in FIG. 2. For example, in the example illustrated in FIG. 2, respective cathodes of the diodes Dio and Doi are coupled to each other. However, the bidirectional switch S may have a configuration where the respective cathodes of the diodes Dio and Doi are not coupled to each other.

The uni-directional switches Sio and Soi are semiconductor switching elements such as a metal-oxide-semiconductor field-effect transistor (MOSFET) and an insulated gate bipolar transistor (IGBT). The uni-directional switches Sio and Soi may employ SiC or GaN that is a next-generation semiconductor switching element.

Returning to FIG. 1, the description of the matrix converter 1 will be continued. The LC filter 11 is disposed between: the R-phase, the S-phase, and the T-phase of the AC power supply 2; and the power converter 10. This LC filter 11 includes three reactors Lr, Ls, and Lt and three capacitors Crs, Cst, and Ctr. This LC filter 11 removes a high-frequency component caused by switching of the bidirectional switch S.

The input voltage detector 12 detects the voltages of the R-phase, the S-phase, and the T-phase of the AC power supply 2. Specifically, the input voltage detector 12 detects respective instantaneous values Er, Es, and Et (hereinafter referred to as input phase voltages Er, Es, and Et) of the R-phase, the S-phase and the T-phase of the AC power supply 2. Here, the voltages of the R-phase, the S-phase, and the T-phase of the AC power supply 2 are referred to collectively as an input voltage Vi in some cases.

The output electric current detector 13 detects the electric current flowing between the power converter 10 and the load 3. Specifically, the output electric current detector 13 detects instantaneous values Iu, Iv, and Iw (hereinafter referred to as output-phase electric currents Iu, Iv, and Iw) of electric currents flowing between: the power converter 10; and the respective U-phase, V-phase, and W-phase of the load 3. Here, in the following description, the output-phase electric currents Iu, Iv, and Iw are referred to collectively as an output electric current Io in some cases. Additionally, the instantaneous values of the respective voltages to be output to the U-phase, the V-phase, and the W-phase of the load 3 from the power converter 10 are described as output phase voltages Vu, Vv, and Vw. The respective phase voltages to be output to the U-phase, the V-phase, and the W-phase of the load 3 from the power converter 10 are referred to collectively as an output voltage Vo in some cases.

Based on the input phase voltages Er, Es, and Et and the output-phase electric currents Iu, Iv, and Iw, the controller 14 generates gate signals S1$u$ to S6$u$, S1$v$ to S6$v$, and S1$w$ to S6$w$. In the following description, the gate signals S1$u$ to S6$u$, S1$v$ to S6$v$, and S1$w$ to S6$w$ are referred to collectively as a gate signal Sg in some cases.

As describe later, the controller 14 switches the commutation method based on the phase of the output electric current Io. This allows accurately performing switching of the commutation method. The following specifically describes a commutation operation.

(1.2. Configuration of Controller 14)

Figure 3:
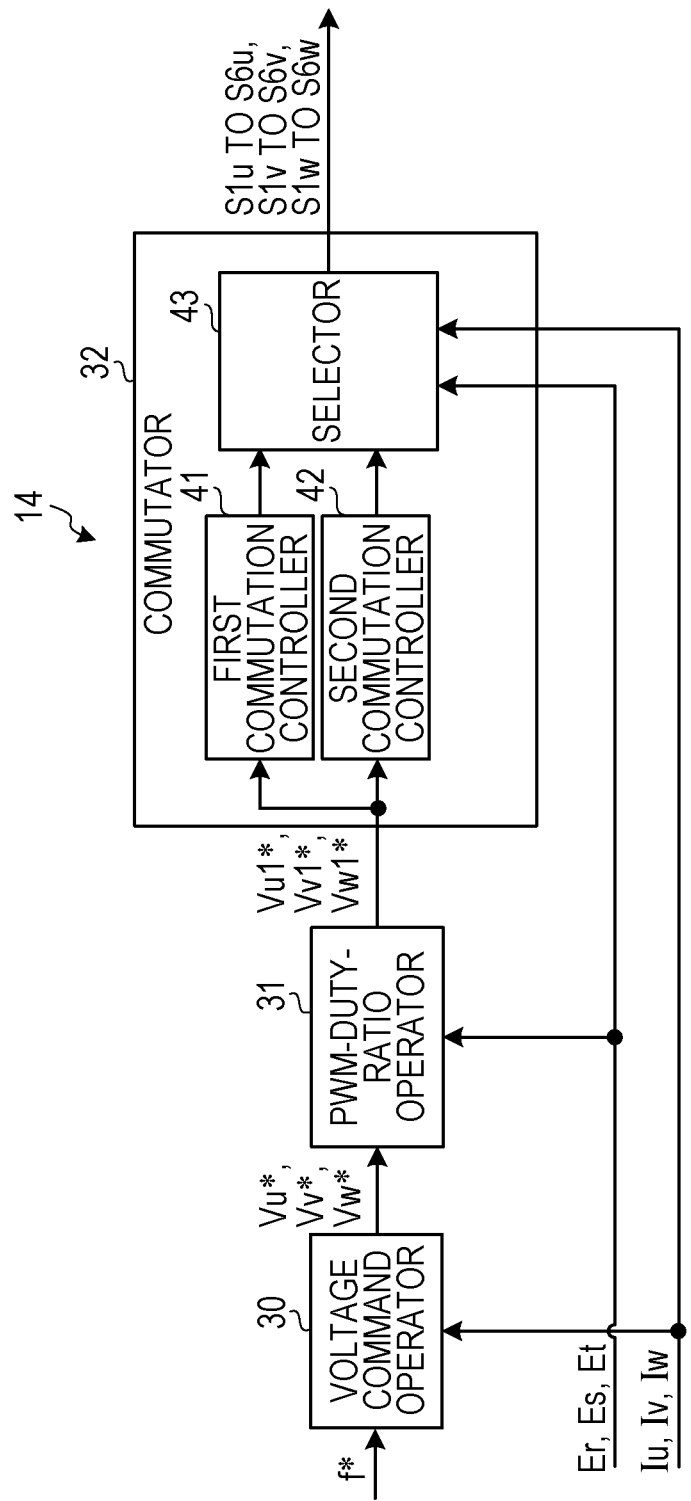
FIG. 3 is a diagram illustrating an exemplary configuration of a controller illustrated in FIG. 1.

FIG. 3 is a diagram illustrating an exemplary configuration of the controller 14. As illustrated in FIG. 3, the controller 14 includes a voltage command operator 30, a PWM-duty-ratio operator 31, and a commutator 32.

This controller 14 includes, for example, a microcomputer that includes a central processing unit (CPU), a read only memory (ROM), a random access memory (RAM), input/output ports, and similar member and various circuits. The CPU of this microcomputer reads out the program stored in the ROM and executes this program so as to function as the voltage command operator 30, the PWM-duty-ratio operator 31, and the commutator 32. Here, the controller 14 may be configured by hardware without using the program.

(1.3. Voltage Command Operator 30)

The voltage command operator 30 generates and outputs voltage commands Vu*, Vv*, and Vw* (hereinafter referred to collectively as a voltage command Vo* in some cases) of the respective output phases based on a frequency command f* and the output-phase electric currents Iu, Iv, and Iw. The frequency command f* is a command for frequencies of output phase voltages Vu, Vv, and Vw.

(1.4. PWM-Duty-Ratio Operator 31)

The PWM-duty-ratio operator 31 generates PWM voltage commands Vu1*, Vv1*, and Vw1* based on the voltage commands Vu*, Vv*, and Vw* and the input phase voltages Er, Es, and Et. The technique for generating the PWM voltage commands Vu1*, Vv1*, and Vw1* is a publicly-known technique. For generation of the PWM voltage commands Vu1*, Vv1*, and Vw1*, for example, a technique disclosed in JP-A-2008-048550 or JP-A-2012-239265 is used.

For example, the PWM-duty-ratio operator 31 sets the input phase voltages Er, Es, and Et to input phase voltage Ep, Em, and En in descending order in a period where the magnitude relationship between the input phase voltages Er, Es, and Et does not change. The PWM-duty-ratio operator 31 converts the voltage commands Vu*, Vv*, and Vw* into pulse width modulation signals corresponding to the respective voltage values of the input phase voltages Ep, Em, and En and outputs the respective signals as the PWM voltage commands Vu1*, Vv1*, and Vw1*. Here, in the following description, the PWM voltage commands Vu1*, Vv1*, and Vw1* are referred to collectively as a PWM voltage command Vo1* in some cases.

(1.5. Commutator 32)

The commutator 32 executes a commutation control that switches the phases of the AC power supply 2 to be coupled to the load 3 with the bidirectional switch S. Specifically, the commutator 32 determines the switching order of the bidirectional switch S during commutation based on the respective polarities of the output-phase electric currents Iu, Iv, and Iw and the input phase voltages Ep, Em, and En corresponding to the PWM voltage commands Vu1*, Vv1* and Vw1*. The commutator 32 generates gate signals S1$u$ to S6$u$, S1$v$ to S6$v$, and S1$w$ to S6$w$ based on the determined switching order.

The gate signals S1$u$ to S6$u$, S1$v$ to S6$v$, and S1$w$ to S6$w$ are input to the respective uni-directional switches Sio and Soi of the bidirectional switch S constituting the power converter 10. Thus, turning on/off of the uni-directional switches Sio and Soi is controlled.

Figure 4:
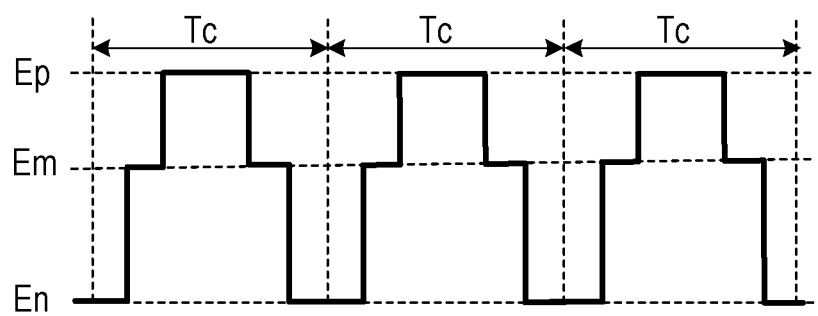
FIG. 4 is a diagram illustrating switching of input phase voltages to be output to respective output phases.

FIG. 4 is a diagram illustrating switching of the input phase voltages Ep, Em, and En to be output to the respective output phases. As illustrated in FIG. 4, the control of the bidirectional switch S with the gate signal Sg causes switching of the input phase voltage to be output to the respective output phases from En to Em to Ep to Em to En in one cycle Tc of the PWM voltage command Vo1* that is the pulse width modulation signal. Here, the switching of the input phase voltage to be output to the output phase is not limited to En to Em to Ep to Em to En.

Figure 5:
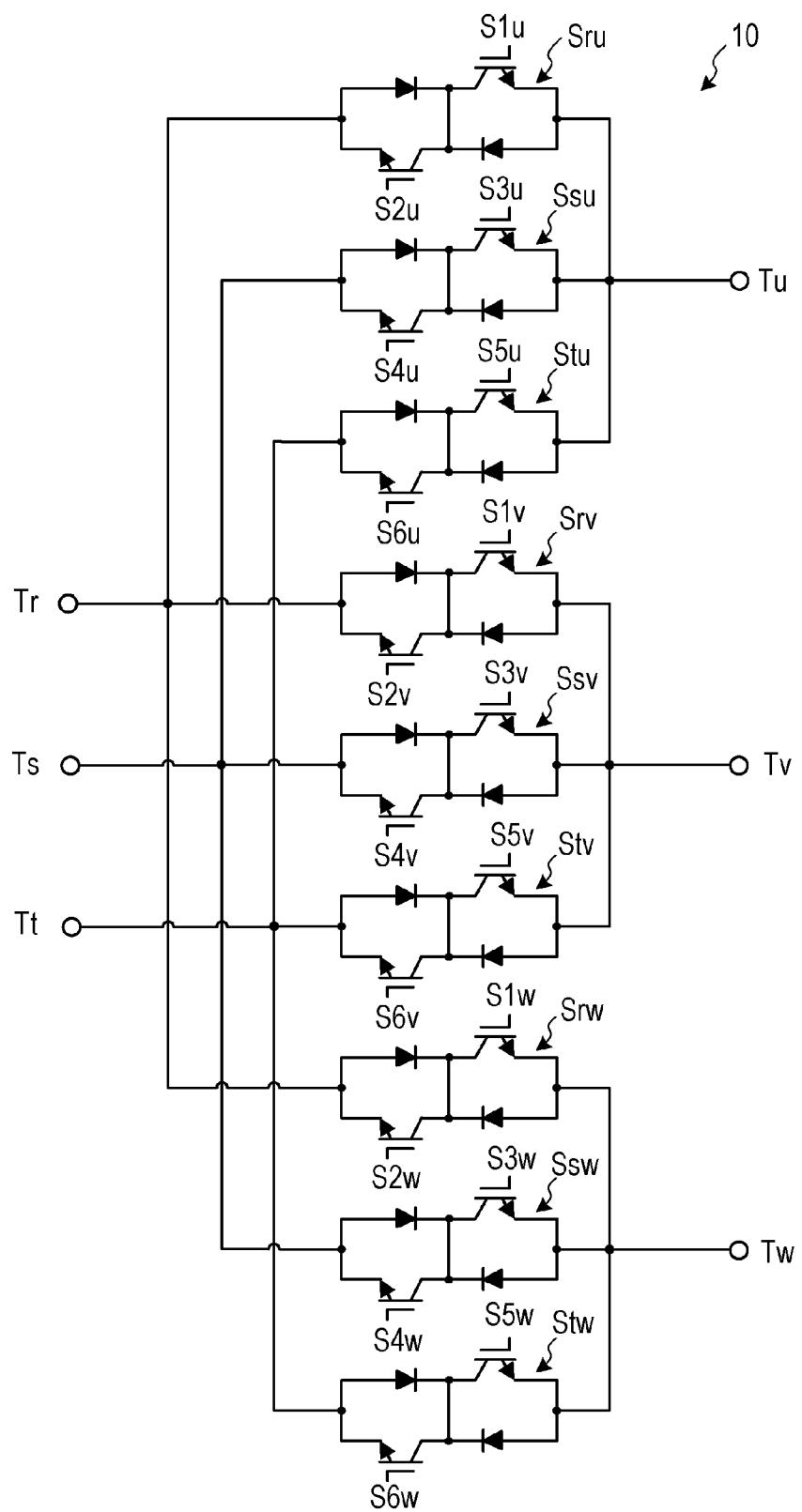
FIG. 5 is a diagram illustrating a correspondence relationship between uni-directional switches of a plurality of bidirectional switches and gate signals.

FIG. 5 is a diagram illustrating a correspondence relationship between: the uni-directional switches Sio and Soi of the plurality of bidirectional switches Sru, Ssu, Stu, Srv, Ssv, Stv, Srw, Ssw, and Stw; and the gate signals S1$u$ to S6$u$, S1$v$ to S6$v$, and S1$w$ to S6$w$. Here, in FIG. 5, the LC filter 11 and the output electric current detector 13 are omitted.

The respective uni-directional switches Sio (see FIG. 2) of the bidirectional switches Sru, Ssu, and Stu are controlled by the gate signals S1$u$, S3$u$, and S5$u$. The respective uni-directional switches Soi (see FIG. 2) of the bidirectional switches Sru, Ssu, and Stu are controlled by the gate signals S2$u$, S4$u$, and S6$u$.

Similarly, the respective uni-directional switches Sio and Soi of the bidirectional switches Srv, Ssv, and Stv are controlled by the gate signals S1v to S6v. The respective uni-directional switches Sio and Soi of the bidirectional switches Srw, Ssw, and Stw are controlled by the gate signals S1w to S6w.

Returning to FIG. 3, the description of the controller 14 will be continued. The commutator 32 includes a first commutation controller 41, a second commutation controller 42, and a selector 43. Both the first commutation controller 41 and the second commutation controller 42 can determine the switching order of the bidirectional switch S and can generate the gate signals S1u to S6u, S1v to S6v, and S1w to S6w.

The selector 43 selects one of the first commutation controller 41 and the second commutation controller 42 based on a phase θo (hereinafter referred to as the output electric current phase θo) of the output electric current Io. Then, the selector 43 outputs the gate signals S1u to S6u, S1v to S6v, and S1w to S6w from the selected commutation controller. This allows reducing the commutation failure such as circuit opening of the output phase. As a result, the accuracy of the output voltage Vo can be improved. The following specifically describes the configurations of the first commutation controller 41, the second commutation controller 42, and the selector 43.

(1.5.1. First Commutation Controller 41)

The first commutation controller 41 performs a commutation control with a first commutation method. The first commutation method is a commutation method in which the dependency on the polarity of the output electric current Io is relatively high compared with a second commutation method. This first commutation method is, for example, a four-step current commutation method.

In the four-step current commutation method, to suppress a short circuit between the input phases and circuit opening of the output phase, a commutation operation is performed with a switching pattern that includes the following step 1 to step 4 corresponding to the polarity of the output electric current Io.

Step 1: A uni-directional switch with the reversed polarity to that of the output electric current Io in the uni-directional switches that constitute the bidirectional switch S (the bidirectional switch S in a coupling condition before the switching) of a switching source is turned off.

Step 2: A uni-directional switch with the same polarity as that of the output electric current Io in the uni-directional switches that constitute the bidirectional switch S (the bidirectional switch S set to be in a coupling condition by the switching) of a switching destination is turned on.

Step 3: A uni-directional switch with the same polarity as that of the output electric current Io in the uni-directional switches that constitute the bidirectional switch S of a switching source is turned off.

Step 4: A uni-directional switch with the reversed polarity to that of the output electric current Io in the uni-directional switches that constitute the bidirectional switch S of a switching destination is turned on.

Figure 7:
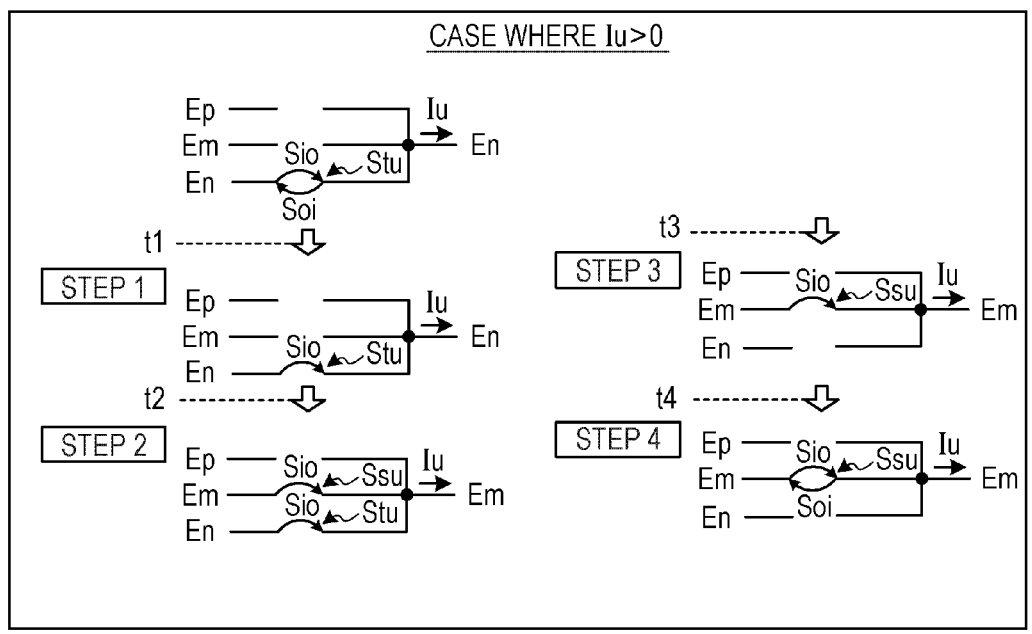
FIG. 7 is a diagram illustrating states of the uni-directional switches in the four-step current commutation method illustrated in FIG. 6A.

The following describes the four-step current commutation method with reference to FIG. 6A, FIG. 6B, and FIG. 7. Here, in the following description, each commutation method will be described using the U-phase as an example. The descriptions of the V-phase and the W-phase on which similar commutation operations are performed are omitted. The polarity of the output electric current Io flowing from the AC power supply 2 to the load 3 is defined to be positive (Io>0).

FIG. 6A and FIG. 6B are diagrams each illustrating a relationship between the output phase voltage Vu and the gate signals S1u to S6u in the four-step current commutation method. FIG. 6A illustrates the commutation operation in the case where the output-phase electric current Iu is positive. FIG. 6B illustrates the commutation operation in the case where the output-phase electric current Iu is negative. FIG. 7 is a diagram illustrating the states of the uni-directional switches Sio and Soi at times t1 to t4 illustrated in FIG. 6A. Here, Ep=Er, Em=Es, and En=Et are satisfied.

In the case where the output-phase electric current Iu is positive, as illustrated in FIG. 6A, at a time t0 before the commutation operation, the gate signals S5u and S6u are at High level and the gate signals S1u to S4u are at Low level. In this state, as illustrated in FIG. 7, the bidirectional switch Stu is in on-state and the other bidirectional switches Ssu and Sru are in off-state. Accordingly, the input phase voltage to be output to the U-phase is En.

The first commutation controller 41 changes the gate signal S6u from High level to Low level at the time t1 when the commutation operation is started (in step 1). Accordingly, as illustrated in FIG. 7, in the bidirectional switch Stu of the switching source, the uni-directional switch Soi with the reversed polarity to that of the output-phase electric current Iu is turned off. At this time, in the bidirectional switch Stu of the switching source, the uni-directional switch Sio with the same conducting direction as the flowing direction of the output-phase electric current Iu is in on-state. Accordingly, circuit opening of the output phase does not occur and the output-phase electric current Iu continues to flow.

Subsequently, the first commutation controller 41 changes the gate signal S3u from Low level to High level at the time t2 (in step 2). Accordingly, as illustrated in FIG. 7, in the bidirectional switch Ssu of the switching destination, the uni-directional switch Sio with the same polarity as that of the output-phase electric current Iu is turned on. At this time, in the bidirectional switch Stu of the switching source, the uni-directional switch Soi with the reverse conducting direction to the flowing direction of the output-phase electric current Iu is in off-state. Accordingly, the input phase voltage to be output to the U-phase is switched from En to Em without occurrence of a short circuit between the phases of the AC power supply 2, and the output-phase electric current Iu continues to flow.

Subsequently, the first commutation controller 41 changes the gate signal S5u from High level to Low level at the time t3 (in step 3). Accordingly, as illustrated in FIG. 7, in the bidirectional switch Stu of the switching source, the uni-directional switch Sio with the same polarity as that of the output-phase electric current Iu is turned off. At this time, in the bidirectional switch Ssu of the switching destination, the uni-directional switch Sio with the same conducting direction as the flowing direction of the output-phase electric current Iu is in on-state. Accordingly, circuit opening of the output phase does not occur and the output-phase electric current Iu continues to flow.

Subsequently, the first commutation controller 41 changes the gate signal S4u from Low level to High level at the time t4 (in step 4). Accordingly, as illustrated in FIG. 7, the conducting direction of the bidirectional switch Ssu of the switching destination becomes bidirectional. On the other hand, the bidirectional switch Stu of the switching source is turned off. Accordingly, the commutation operation that switches the input phase voltage to be output to the U-phase from En to Em is completed.

Also at time t5 to t7 illustrated in FIG. 6A and at times t1 to t17 illustrated in FIG. 6B, the uni-directional switches Sio and Soi are controlled similarly to the cases at t1 to t4 illustrated in FIG. 6A.

Thus, performing the commutation control with the four-step current commutation method allows changing the voltage to be output as the output phase voltage Vu from En to Em to Ep to Em to En while suppressing a short circuit between the phases for the input phase, circuit opening of the output phase, and similar trouble. Also on the output phase voltages Vv and Vw, the commutation controls are performed with similar controls.

(1.5.2. Second Commutation Controller 42)

The second commutation controller 42 performs a commutation control with the second commutation method. The second commutation method is a commutation method in which the dependency on the polarity of the output electric current Io is relatively low compared with the first commutation method. This second commutation method is, for example, a four-step voltage commutation method.

In the four-step voltage commutation method, to suppress a short circuit between the input phases and circuit opening of the output phase, a commutation operation is performed with a switching pattern that includes the following step 1 to step 4 corresponding to the magnitude relationship between the input phase voltages Er, Es, and Et. In this four-step voltage commutation operation, there is no need for changing the switching pattern corresponding to the polarity of the output electric current Io.

Step 1: A uni-directional switch to be inversely biased in the bidirectional switch S of the switching destination is turned on.

Step 2: A uni-directional switch to be inversely biased in the bidirectional switch S of the switching source is turned off.

Step 3: A uni-directional switch to be forward biased in the bidirectional switch S of the switching destination is turned on.

Step 4: A uni-directional switch to be forward biased in the bidirectional switch S of the switching source is turned off.

Here, in the uni-directional switch Sio, the state where the input-side voltage is lower than the output-side voltage immediately before the commutation operation is described as inverse bias. The state where the input-side voltage is higher than the output-side voltage immediately before the commutation operation is described as forward bias. In the uni-directional switch Soi, the state where the input-side voltage is lower than the output-side voltage immediately before the commutation operation is described as forward bias. The state where the input-side voltage is higher than the output-side voltage immediately before the commutation operation is described as inverse bias.

Figure 8:
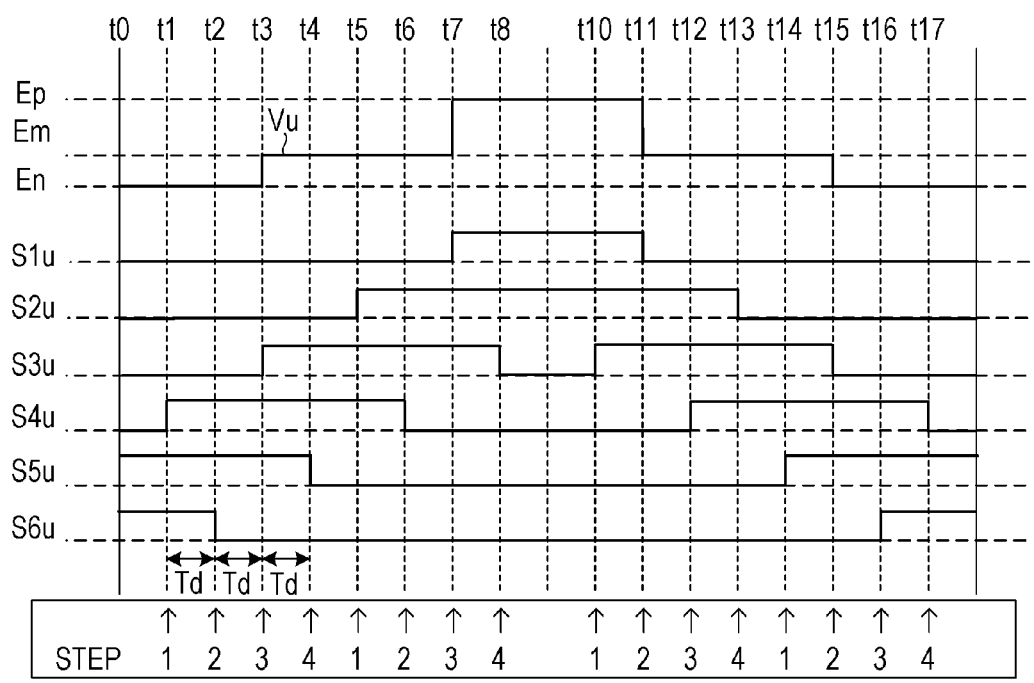
FIG. 8 is a diagram illustrating a relationship between the output phase voltage, the gate signals, and respective steps of a commutation operation in a four-step voltage commutation method.
Figure 9:
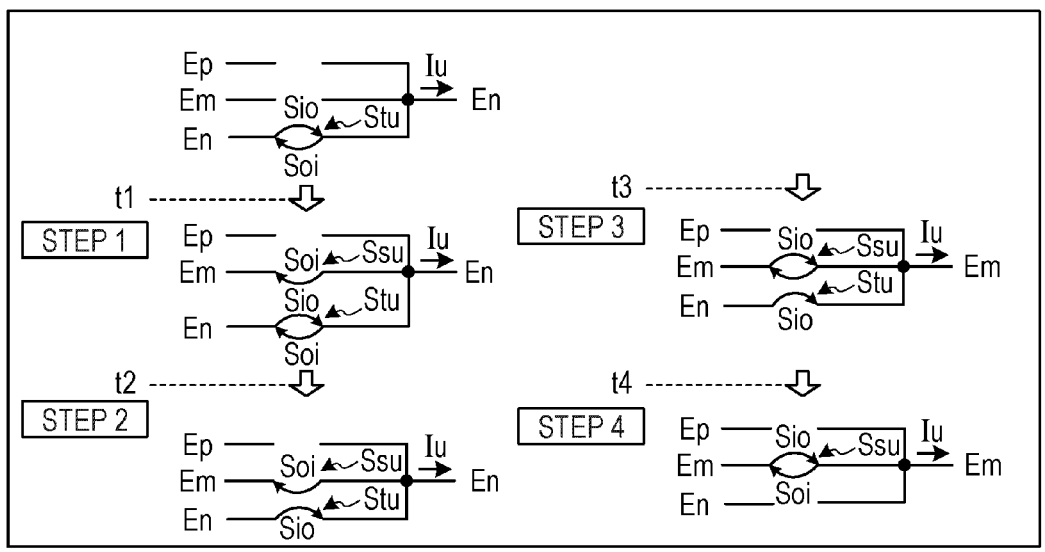
FIG. 9 is a diagram illustrating states of the uni-directional switches in the four-step voltage commutation method illustrated in FIG. 8.

FIG. 8 is a diagram illustrating a relationship between the output phase voltage Vu, the gate signals S1u to S6u, and the respective steps of the commutation operation in the four-step voltage commutation method. FIG. 9 is a diagram illustrating the states of the uni-directional switches Sio and Soi at times t1 to t4 illustrated in FIG. 8. Here, Ep=Er, Em=Es, and En=Et are satisfied.

As illustrated in FIG. 8, the second commutation controller 42 changes the gate signal S4u from Low level to High level at the time t1. Accordingly, as illustrated in FIG. 9, in the bidirectional switch Ssu of the switching destination, the uni-directional switch Soi is turned on (in step 1). At this time, the uni-directional switch Soi of the bidirectional switch Ssu is the uni-directional switch with the reverse conducting direction to the flowing direction of the output-phase electric current Iu. Accordingly, a short circuit between the phases for the input phase does not occur.

Subsequently, the second commutation controller 42 changes the gate signal S6u from High level to Low level at the time t2. Accordingly, as illustrated in FIG. 9, in the bidirectional switch Stu of the switching source, the uni-directional switch Soi is turned off (in step 2). At this time, in the bidirectional switch Stu, the uni-directional switch Sio with the same conducting direction as the flowing direction of the output-phase electric current Iu is in on-state. Accordingly, circuit opening of the output phase does not occur, and the output-phase electric current Iu continues to flow.

Subsequently, the second commutation controller 42 changes the gate signal S3u from Low level to High level at the time t3. Accordingly, as illustrated in FIG. 9, in the bidirectional switch Ssu of the switching destination, the uni-directional switch Sio is turned on (in step 3). Accordingly, the input phase voltage to be output to the U-phase is switched from En to Em, and the output-phase electric current Iu continues to flow.

Subsequently, the second commutation controller 42 changes the gate signal S5u from High level to Low level at the time t4(in step 4). Accordingly, as illustrated in FIG. 9, the conducting direction of the bidirectional switch Ssu of the switching destination becomes bidirectional while the bidirectional switch Stu of the switching source is turned off. Accordingly, the commutation operation that switches the input phase voltage to be output to the U-phase from En to Em is completed.

Also at times t5 to t8, t10 to t13, and t14 to t17 illustrated in FIG. 8, the switching process that includes step 1 to step 4 similarly to the cases at the times t1 to t4. Here, a step interval Td is set to a time longer than the turn-on time and the turn-off time of the uni-directional switches Sio and Soi. For convenience of explanation, the step interval Td has a constant value. However, the respective intervals may have different values. The same applies to the four-step current commutation method described above and the commutation method described below.

Thus, the four-step voltage commutation method allows changing the voltage to be output as the output phase voltage Vu from En to Em to Ep to Em to En while suppressing a short circuit between the phases for the input phase, circuit opening of the output phase, and similar trouble. Also on the output phase voltage Vv and Vw, the commutation controls are performed with similar controls while a short-circuit failure is suppressed.

(1.5.3. Selector 43)

Next the selector 43 will be described. The selector 43 selects the commutation controller that performs the commutation control from the first commutation controller 41 and the second commutation controller 42 based on the output electric current phase θo. As described above, the first commutation controller 41 performs the commutation control with the first commutation method and the second commutation controller 42 performs the commutation control with the second commutation method.

Figure 10:
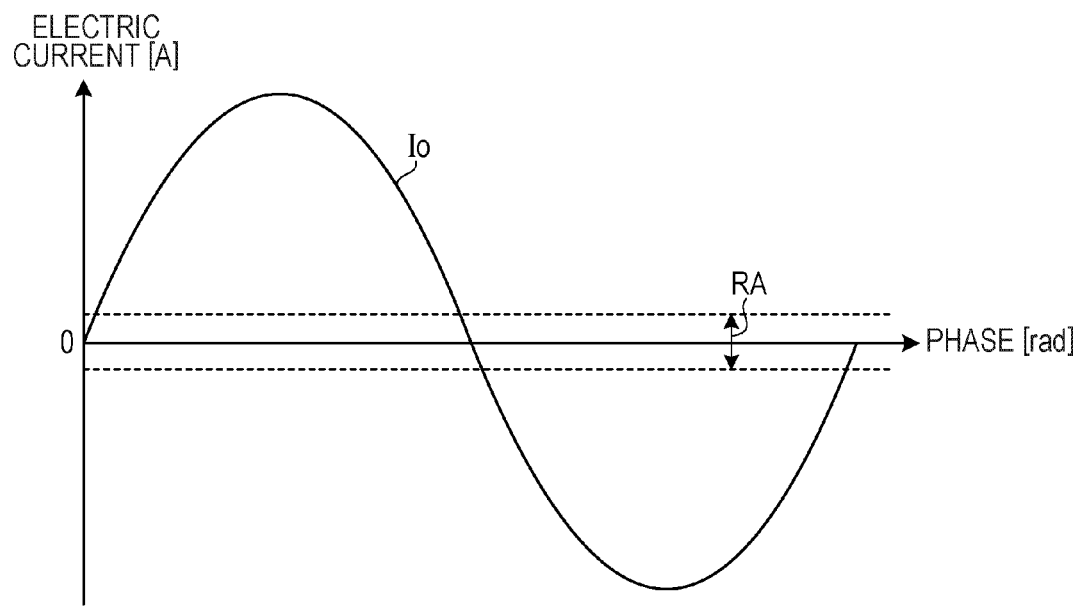
FIG. 10 is a graph illustrating a waveform of an output electric current.

The first commutation method has the relatively high dependency on the polarity of the output electric current Io. Accordingly, the first commutation method is susceptible to the detection sensitivity and the detection noise of the output electric current detector 13 and similar cause. Therefore, for example, in the region (the region where the absolute value of the output electric current is smaller than a predetermined threshold (first threshold) where the output electric current Io is small like a region RA illustrated in FIG. 10, circuit opening of the output phase might occur due to a mistake on the polarity of the output electric current Io. Accordingly, in the case where circuit opening of the output phase occurs, a surge voltage occurs. Thus, the accuracy of the output voltage Vo is decreased.

On the other hand, the second commutation method has the relatively low dependency on the polarity of the output electric current Io. Accordingly, the second commutation method is insusceptible to the detection sensitivity and the detection noise of the output electric current detector 13 and similar cause compared with the first commutation method. Therefore, the selector 43 selects the second commutation controller 42 in the region where a commutation failure might occur in the first commutation method so as to cause the second commutation controller 42 to execute the commutation control with the second commutation method.

The selector 43 makes a determination of the region where a commutation failure might occur in the first commutation method based not on the absolute value of the output electric current Io but on the output electric current phase θo. Specifically, the selector 43 selects the first commutation controller 41 in the case where the output electric current phase θo is out of a predetermined range, and selects the second commutation controller 42 in the case where the output electric current phase θo is within the predetermined range. Here, the predetermined range of the output electric current phase θo is, for example, the range of the output electric current phase θo where the absolute value of the output electric current Io is smaller than the predetermined threshold (first threshold).

Accordingly, the selector 43 can accurately determine the region where the commutation failure might occur in the first commutation method and cause the second commutation controller 42 to execute the commutation control with the second commutation method. This consequently allows suppressing reduction of the accuracy of the output voltage Vo due to a commutation failure by the first commutation controller 41.

Figure 11:
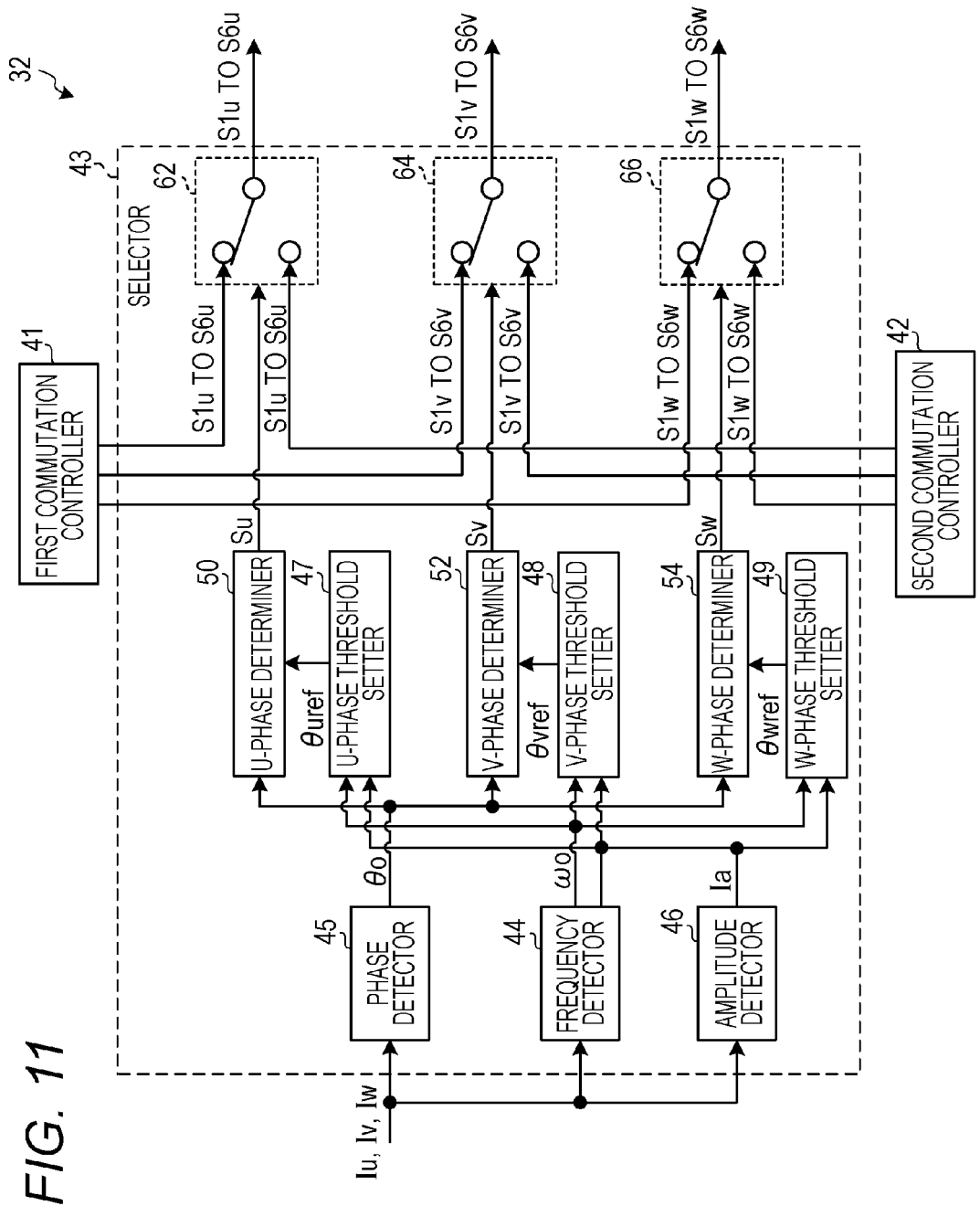
FIG. 11 is a diagram illustrating a configuration of a selector illustrated in FIG. 3.

FIG. 11 is a diagram illustrating the configuration of the selector 43. As illustrated in FIG. 11, the selector 43 includes a frequency detector 44, a phase detector 45, an amplitude detector 46, a U-phase threshold setter 47, a V-phase threshold setter 48, a W-phase threshold setter 49, a U-phase determiner 50, a V-phase determiner 52, a W-phase determiner 54, a U-phase switcher 62, a V-phase switcher 64, and a W-phase switcher 66.

The frequency detector 44 detects a frequency ωo (hereinafter referred to as the output electric current frequency ωo) of the output electric current Io based on the output-phase electric currents Iu, Iv, and Iw. The output-phase electric currents Iu, Iv and Iw are detected by the output electric current detector 13 or estimated by a motor angular speed detector (not illustrated) or from an output voltage command or similar parameter. The frequency detector 44 has, for example, a phase locked loop (PLL) and similar member.

The phase detector 45 detects the output electric current phase θo based on the output-phase electric currents Iu, Iv, and Iw. The phase detector 45 has, for example, a PLL, an integrator, and similar member. Here, the phase detector 45 can also detect the output electric current phase θo by, for example, integrating the output electric current frequency ωo from the frequency detector 44.

The amplitude detector 46 detects an amplitude Ia (hereinafter referred to as the output electric current amplitude Ia) of the output electric current Io based on the output-phase electric currents Iu, Iv, and Iw.

Figure 12:
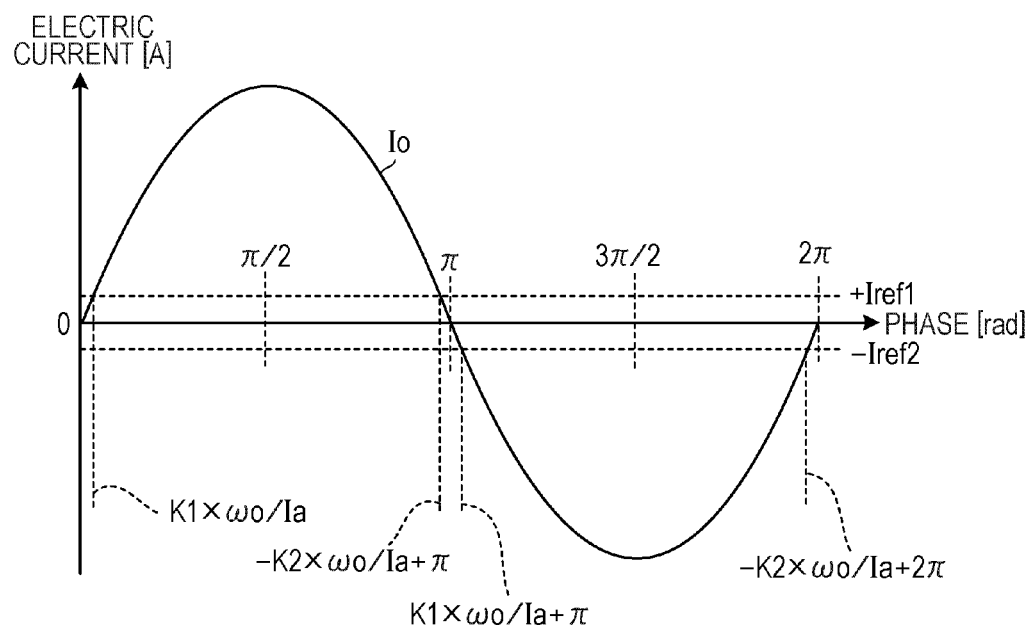
FIG. 12 is a graph illustrating an exemplary threshold phase range.

The U-phase threshold setter 47 generates a U-phase threshold phase range θuref based on the output electric current frequency ωo and the output electric current amplitude Ia, and outputs this range to the U-phase determiner 50. FIG. 12 is a diagram illustrating one example of the U-phase threshold phase range θuref.

As illustrated in FIG. 12, the U-phase threshold setter 47 sets, for example, each of a range from 0 to K1×ωo/Ia, a range from −K2 ×ωo/Ia+π to K1 ×ωo/Ia+π, and a range from −K2×ωo/Ia+2π to 2π as the U-phase threshold phase range θuref. Here, in the case where ωo is positive, the coefficients K1 and K2 are set to satisfy K1 >K2. In the case where ωo is negative, the coefficients K1 and K2 are set to satisfy K1 <K2.

The V-phase threshold setter 48 generates a V-phase threshold phase range θvref based on the output electric current frequency ωo and the output electric current amplitude Ia, and outputs this range to the V-phase determiner 52. The V-phase threshold phase range θvref is a range shifted with respect to the U-phase threshold phase range θuref by 2π/3. For example, the V-phase threshold phase range θvref is from −K1×ωo/Ia+2π/3 to K2×ωo/Ia+2π/3 and from −K1× ωo/Ia+5π/3 to K2×ωo/Ia+5π/3.

The W-phase threshold setter 49 generates a W-phase threshold phase range θwref based on the output electric current frequency ωo and the output electric current amplitude Ia, and outputs this range to the W-phase determiner 54. The W-phase threshold phase range θwref is a range shifted with respect to the U-phase threshold phase range θuref by 4π/3. For example, the W-phase threshold phase range θwref is from −K1×ωo/Ia+π/3 to K2×ωo/Ia+π/3 and from −K1× ωo/Ia+4π/3 to K2×ωo/Ia+4π/3.

The U-phase determiner 50 outputs a U-phase selection signal Su based on the output electric current phase θo and the U-phase threshold phase range θuref to select the commutation controller that performs the commutation control of the U-phase from the first and second commutation controllers 41 and 42.

Specifically, the U-phase determiner 50 outputs the U-phase selection signal Su at High level in the case where the output electric current phase θo is out of the U-phase threshold phase range θuref. The U-phase determiner 50 outputs the U-phase selection signal Su at Low level in the case where the output electric current phase θo is within the U-phase threshold phase range θuref.

The U-phase switcher 62 outputs the gate signals S1u to S6u output from the first commutation controller 41 in the case where the U-phase selection signal Su is at High level. The U-phase switcher 62 outputs the gate signals S1u to S6u output from the second commutation controller 42 in the case where the U-phase selection signal Su is at Low level.

The output electric current phase θo is insusceptible to the detection error in the output electric current detector 13 compared with the output-phase electric current Iu, Iv, and Iw themselves. Accordingly, using the output electric current phase θo improves the accuracy of the switching determination of the commutation method.

The U-phase threshold phase range θuref is adjusted corresponding to the output electric current amplitude Ia. Specifically, in the case where the output electric current amplitude Ia is large, the U-phase threshold phase range θuref becomes narrow. In the case where the output electric current amplitude Ia is small, the U-phase threshold phase range θuref becomes wide. Accordingly, in the case where the output-phase electric current Iu is in the region RA (see FIG. 10), the second commutation method can be accurately selected. On the other hand, in the case where the output-phase electric current Iu is out of the region RA, the possibility to select the second commutation method can be reduced. This allows improving the accuracy of the output phase voltage Vu.

In the case where ωo is positive, K1>K2 is satisfied. In the case where ωo is negative, K1<K2 is satisfied. Accordingly, the delay of switching of the switching pattern corresponding to the polarity of the output electric current Io can be compensated.

Figure 13:
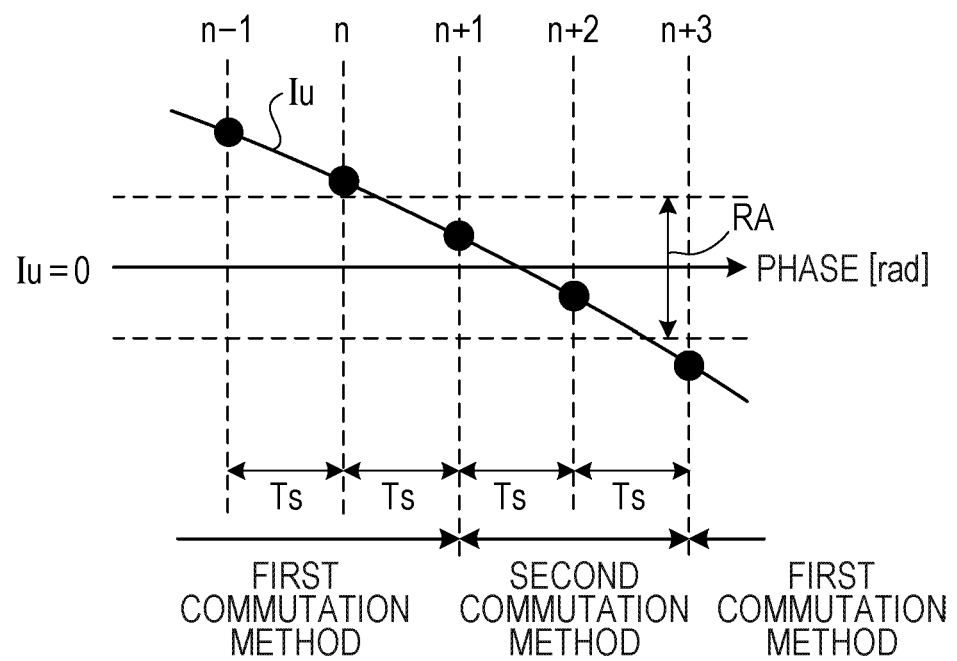
FIG. 13 is a graph illustrating a conceptual relationship between the output-phase electric current, a selection cycle of the commutation method, and the selected commutation method.

For example, the case where K1=K2, as illustrated in FIG. 13, even in the case where the output-phase electric current Iu is in the region RA, the first commutation method might be selected. FIG. 13 is a graph illustrating a conceptual relationship between the output-phase electric current, the selection cycle Ts of the commutation method, and the commutation method to be selected in the case where K1=K2.

Therefore, setting the coefficients K1 and K2 to mutually different values corresponding to the polarity of ωo allows accurately selecting the second commutation method in the case where the output-phase electric current Iu is in the region RA. For example, in the example illustrated in FIG. 13, the second commutation method is selected from a sample point n+1. However, increasing the coefficient K1 by the amount corresponding to the selection cycle Ts allows accurately selecting the second commutation method from a sample point n. On the other hand, in the example illustrated in FIG. 13, the second commutation method is selected until a sample point n+3 even without changing the coefficient K2. Accordingly, in the case where the coefficient K2 is smaller than the coefficient K1, the second commutation method can be accurately selected.

The U-phase threshold phase range θuref is adjusted based on the output electric current frequency ωo. When the output electric current frequency ωo is high, the number of selections of the commutation method is reduced in the case where the output-phase electric current Iu is in the region RA. Therefore, the U-phase threshold setter 47 generates the U-phase threshold phase range θuref such that the U-phase threshold phase range θuref becomes wider as the output electric current frequency ωo becomes higher. This reduces the situation that the number of selections of the commutation method becomes extremely small in the case where the output-phase electric current Iu is in the region RA. Here, the U-phase threshold setter 47 can also adjust the U-phase threshold phase range θuref based on the output electric current frequency ωo in the case where the output electric current frequency ωo is equal to or more than a predetermined value.

Thus setting the U-phase threshold phase range θuref allows the matrix converter 1 to reduce the margin compared with the case where the commutation method is selected using the absolute value of the output-phase electric current Iu. As a result, the switching accuracy of the commutation method can be improved.

Returning to FIG. 11, the description of the selector 43 will be continued. In the case where the output electric current phase θo is out of the V-phase threshold phase range θvref, the V-phase determiner 52 outputs a V-phase selection signal Sv at High level. In the case where the output electric current phase θo is within the V-phase threshold phase range θvref, the V-phase determiner 52 outputs the V-phase selection signal Sv at Low level.

In the case where the V-phase selection signal Sv is at High level, the V-phase switcher 64 outputs the gate signals S1v to S6v output from the first commutation controller 41. In the case where the V-phase selection signal Sv is at Low level, the V-phase switcher 64 outputs the gate signals S1v to S6v output from the second commutation controller 42.

The V-phase threshold phase range θvref is set similarly to the U-phase threshold phase range θuref, and then compared with the output electric current phase θo. Accordingly, also in the V-phase, the switching accuracy of the commutation method can be improved similarly to the U-phase.

In the case where the output electric current phase θo is out of the W-phase threshold phase range θwref, the W-phase determiner 54 outputs a W-phase selection signal Sw at High level. In the case where the output electric current phase θo is within the W-phase threshold phase range θwref, the W-phase determiner 54 outputs the W-phase selection signal Sw at Low level.

In the case where the W-phase selection signal Sw is at High level, the W-phase switcher 66 outputs the gate signals S1w to S6w output from the first commutation controller 41. In the case where the W-phase selection signal Sw is at Low level, the W-phase switcher 66 outputs the gate signals S1w to S6w output from the second commutation controller 42.

The W-phase threshold phase range θwref is set similarly to the U-phase threshold phase range θuref, and then compared with the output electric current phase θo. Accordingly, also in the W-phase, the switching accuracy of the commutation method can be improved similarly to the U-phase.

As described above, in the matrix converter 1 according to this embodiment, the commutation controller that executes the commutation control is selected from the first and second commutation controllers 41 and 42 based on the output electric current phase θo. This allows improving the switching accuracy of the commutation method.

Additionally, improving the switching accuracy of the commutation method allows suppressing occurrence of surge. This consequently allows suppressing failure of the power converter 10 without disposing a snubber circuit with a large size and a large capacity or similar circuit. Thus, this allows ensuring the downsized, highly-efficient, and low-cost matrix converter 1.

In the above description, the first commutation method employs the four-step current commutation method as the example and the second commutation method employs the four-step voltage commutation method as the example. However, the combination of the first commutation method and the second commutation method is not limited to the above-described combination.

Figure 14:
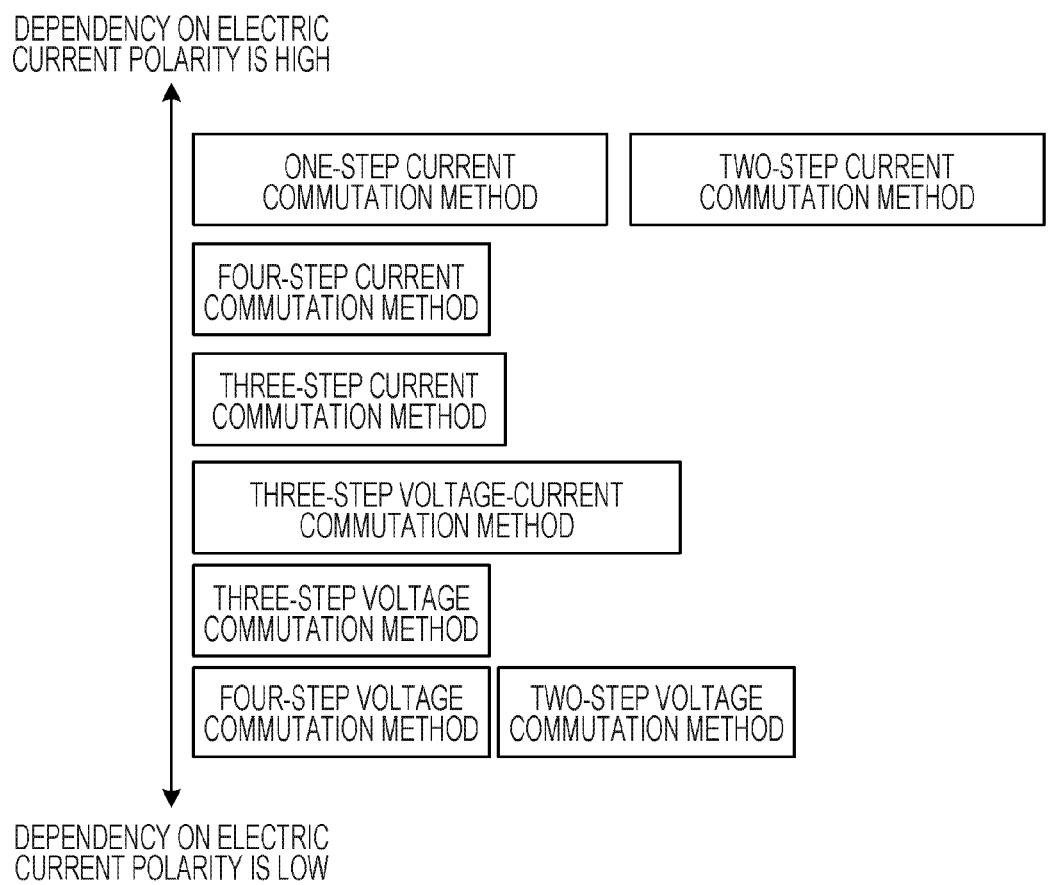
FIG. 14 is a diagram illustrating a relationship between dependency on the polarity of the output electric current and types of the commutation method.

FIG. 14 is a diagram illustrating a relationship between the dependency on the polarity of the output electric current Io and the types of the commutation method. The commutation method in which the output opening duration during the commutation operation is relatively long at the time of a mistake on the polarity of the output electric current Io is the commutation method in which the dependency on the polarity of the output electric current Io is relatively high.

The first commutation controller 41 stores a parameter Ps1 indicative of the type of the first commutation method in a storage inside. The first commutation controller 41 performs the commutation control with the commutation method corresponding to the parameter Ps1. The second commutation controller 42 stores a parameter Ps2 indicative of the type of the second commutation method in a storage inside. The second commutation controller 42 performs the commutation control with the commutation method corresponding to the parameter Ps2.

The parameters Ps1 and Ps2 are set on the condition that the dependency (hereinafter referred to as the electric-current-polarity dependency) on the polarity of the output electric current Io in the first commutation method is higher than the electric-current-polarity dependency in the second commutation method. The parameters Ps1 and Ps2 are set, for example, by the installation personnel of the matrix converter 1 or similar person through an input unit (not illustrated).

Here, the respective commutation methods illustrated in FIG. 14 will be described. Note that FIG. 14 only illustrates the example of the types of the commutation method. In the matrix converter 1, the commutation method that is not illustrated in FIG. 14 can be specified by the parameters Ps1 and Ps2.

Figure 15A:
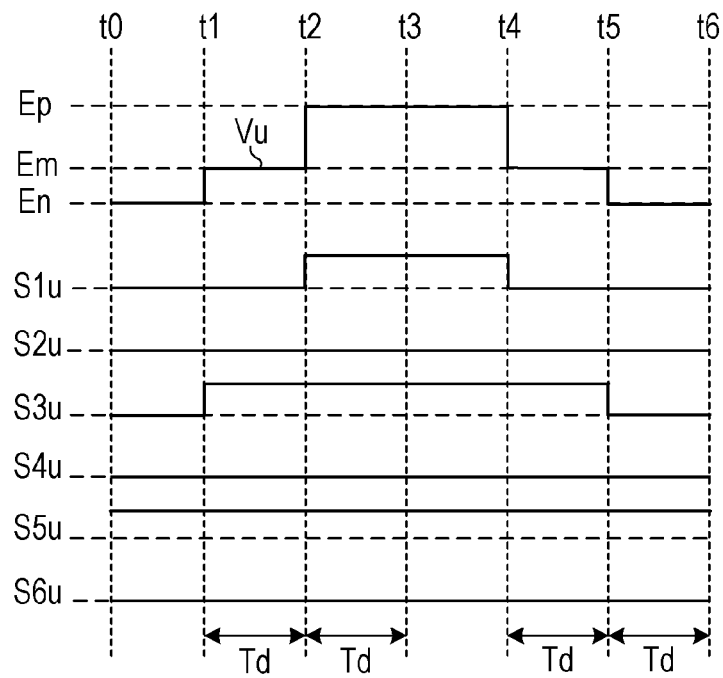
FIG. 15A is a diagram illustrating a relationship between the output phase voltage and the gate signals in the case where the output-phase electric current is positive in a one-step current commutation method.
Figure 15B:
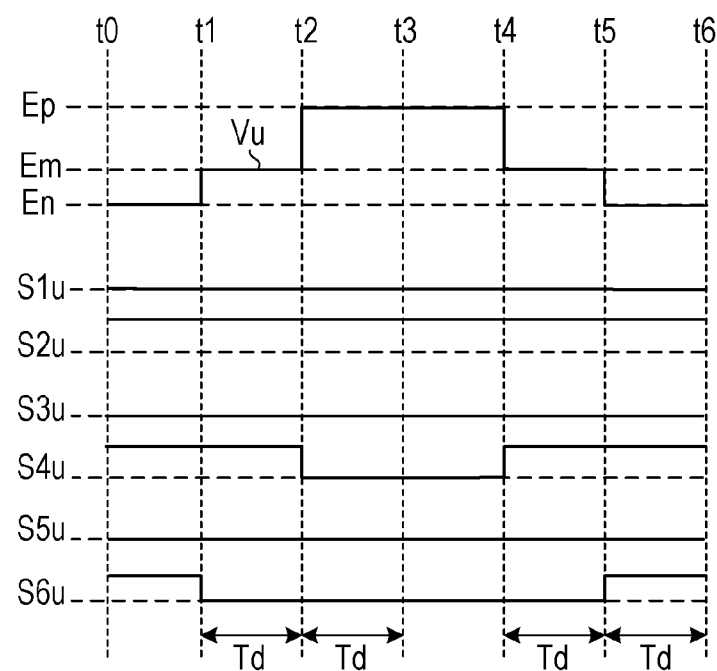
FIG. 15B is a diagram illustrating a relationship between the output phase voltage and the gate signals in the case where the output-phase electric current is negative in the one-step current commutation method.

A "one-step current commutation method" is a commutation method that switches the input phase voltage to be output to the output phase every one step. For example, the commutation control is executed as illustrated in FIG. 15A and FIG. 15B. FIG. 15A and FIG. 15B are diagrams corresponding to FIG. 6A and FIG. 6B, and diagrams illustrating relationships between the output phase voltage Vu, the gate signals S1$u$ to S6$u$, and the respective steps of the commutation operation in the one-step current commutation method.

A "two-step current commutation method" is a commutation method that switches the input phase voltage to be output to each output phase in two steps. In this two-step current commutation method, a uni-directional switch that has the conducting direction in the same direction of the output electric current Io in the bidirectional switch S of the switching destination is turned on (in step 1). Subsequently, a uni-directional switch that has the conducting direction in the same direction of the output electric current Io in the bidirectional switch S of the switching source is turned off (in step 2). FIG. 16A and FIG. 16B are diagrams corresponding to FIG. 6A and FIG. 6B, and diagrams illustrating relationships between the output phase voltage Vu, the gate signals S1$u$ to S6$u$, and the respective steps of the commutation operation in the two-step current commutation method.

Figure 17A:
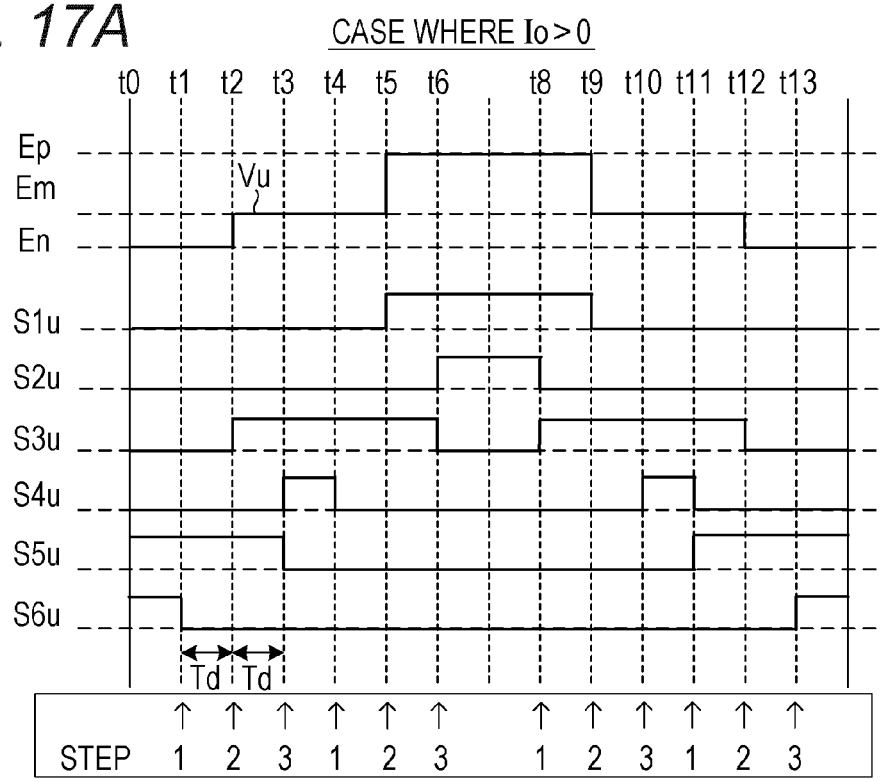
FIG. 17A is a diagram illustrating a relationship between the output phase voltage and the gate signals in the case where the output-phase electric current is positive in a three-step current commutation method.
Figure 17B:
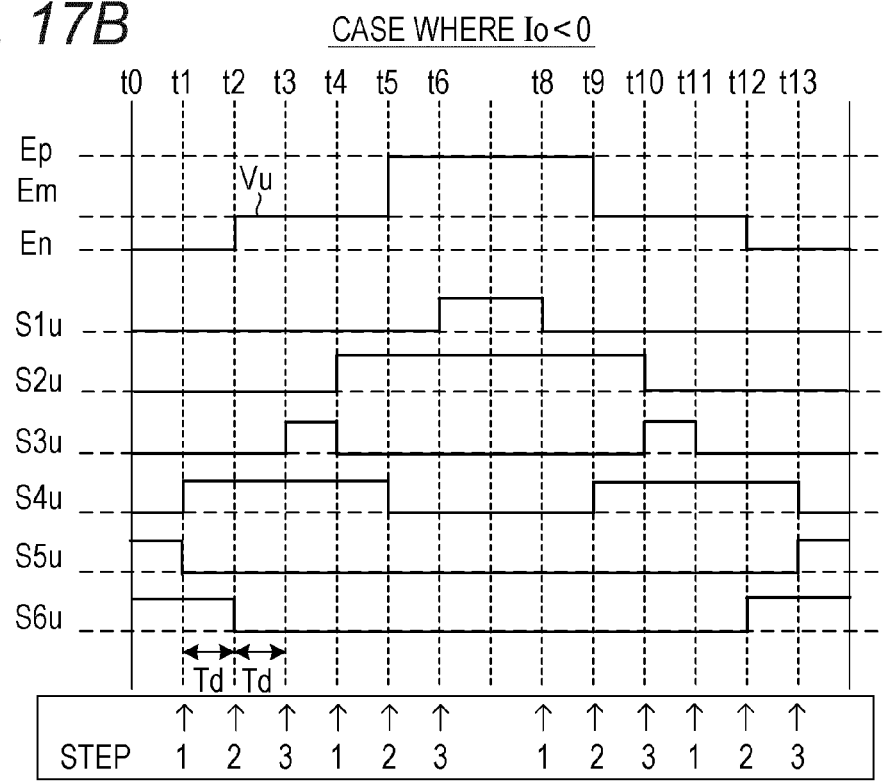
FIG. 17B is a diagram illustrating a relationship between the output phase voltage and the gate signals in the case where the output-phase electric current is negative in the three-step current commutation method.

A "three-step current commutation method" is a commutation method that switches the input phase voltage to be output to each output phase in three steps. For example, as illustrated in FIG. 17A and FIG. 17B, the commutation control is executed. FIG. 17A and FIG. 17B are diagrams corresponding to FIG. 6A and FIG. 6B, and diagrams illustrating relationships between the output phase voltage Vu, the gate signals S1$u$ to S6$u$, and the respective steps of the commutation operation in the three-step current commutation method.

Figure 18A:
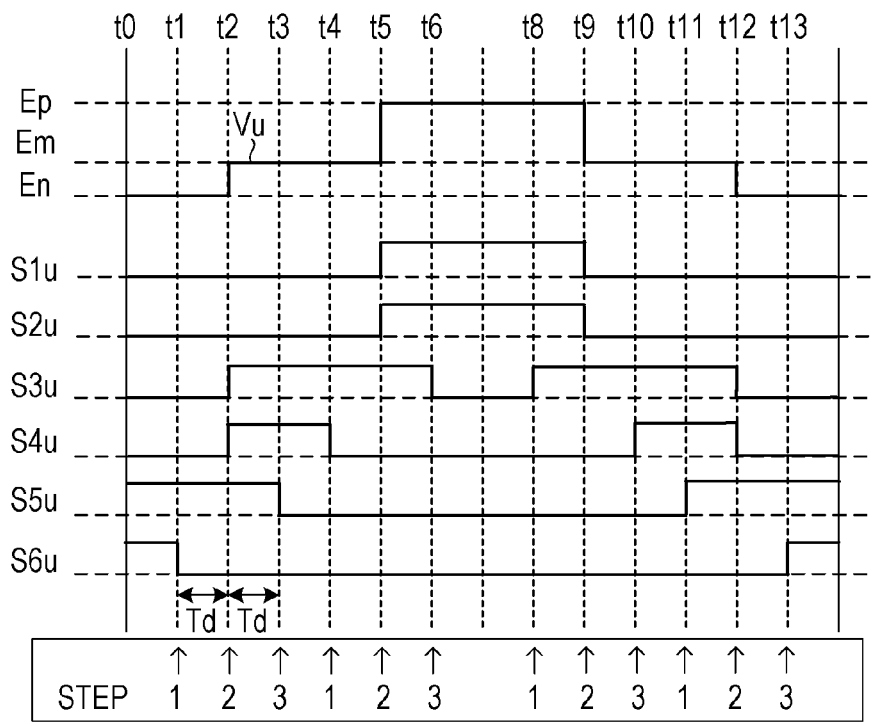
FIG. 18A is a diagram illustrating a relationship between the output phase voltage and the gate signals in the case where the output-phase electric current is positive in a three-step voltage-current commutation method.
Figure 18B:
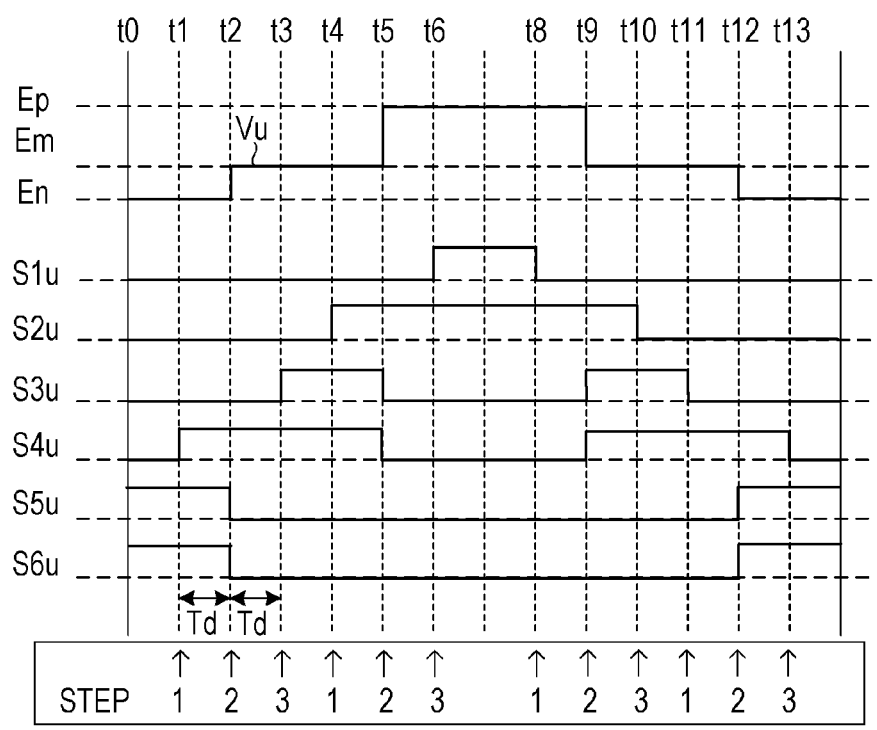
FIG. 18B is a diagram illustrating a relationship between the output phase voltage and the gate signals in the case where the output-phase electric current is negative in the three-step voltage-current commutation method.

In a "three-step voltage-current commutation method," one of step 1 and step 2 is set as the step corresponding to the three-step voltage commutation method and the other is set as the step corresponding to the three-step current commutation method. FIG. 18A and FIG. 18B are diagrams corresponding to FIG. 6A and FIG. 6B, and diagrams illustrating relationships between the output phase voltage Vu, the gate signals S1$u$ to S6$u$, and the respective steps of the commutation operation in the three-step voltage-current commutation method.

Figure 19A:
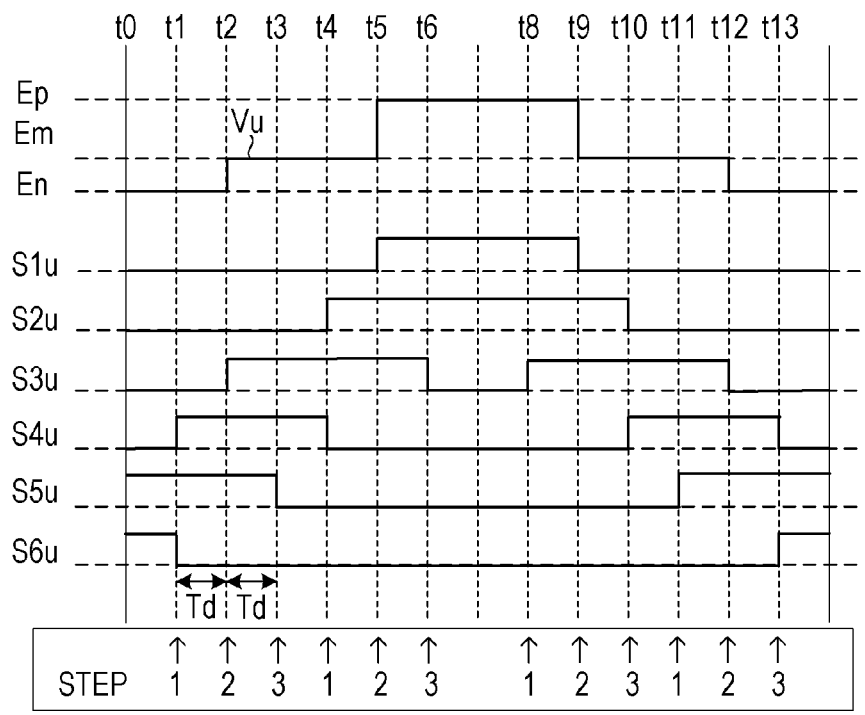
FIG. 19A is a diagram illustrating a relationship between the output phase voltage and the gate signals in the case where the output-phase electric current is positive in a three-step voltage commutation method.
Figure 19B:
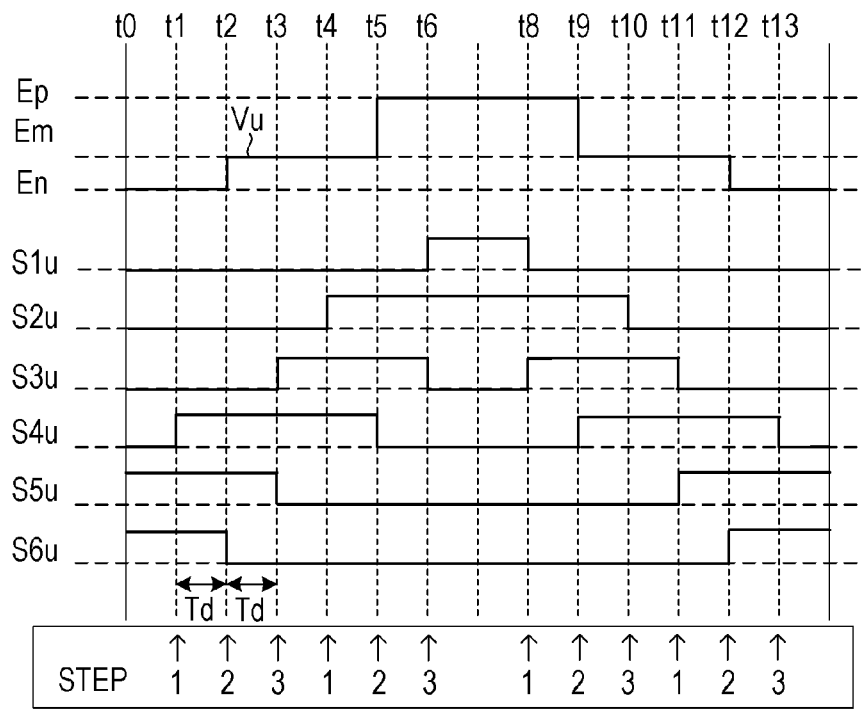
FIG. 19B is a diagram illustrating a relationship between the output phase voltage and the gate signals in the case where the output-phase electric current is negative in the three-step voltage commutation method.

A "three-step voltage commutation method" is a commutation method that switches the input phase voltage to be output to each output phase in three steps. For example, as illustrated in FIG. 19A and FIG. 19B, the commutation control is executed. FIG. 19A and FIG. 19B are diagrams corresponding to FIG. 6A and FIG. 6B, and diagrams illustrating relationships between the output phase voltage Vu, the gate signals S1$u$ to S6$u$, and the respective steps of the commutation operation in the three-step voltage commutation method.

Figure 20:
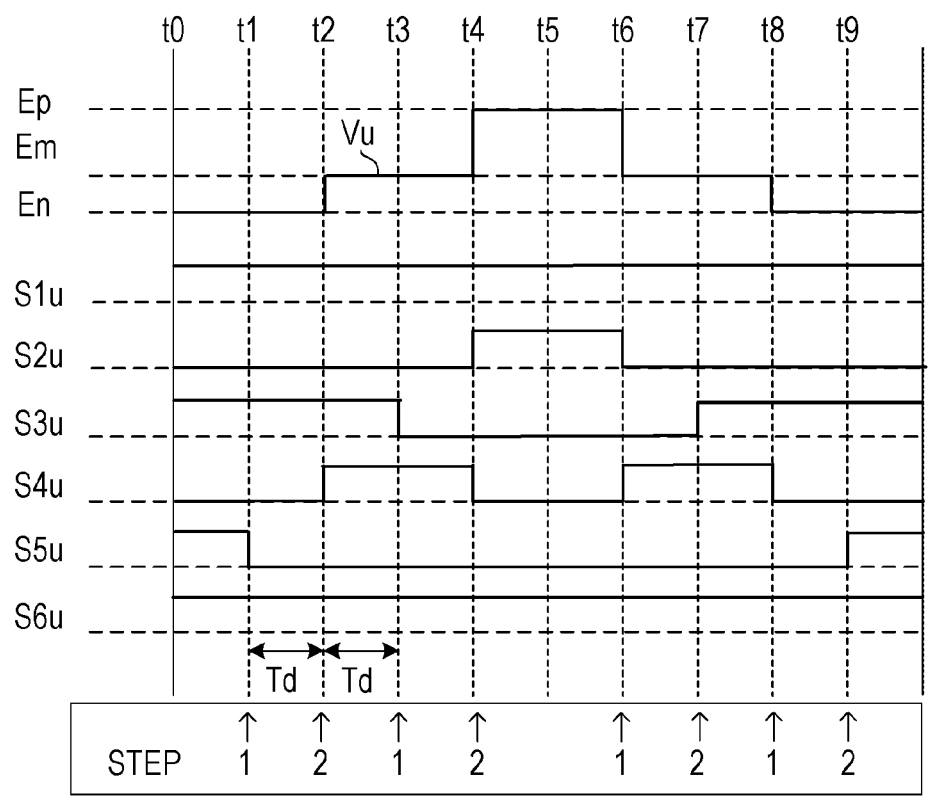
FIG. 20 is a diagram illustrating a relationship between the output phase voltage, the gate signals, and the respective steps of the commutation operation in a two-step voltage commutation method.

A "two-step voltage commutation method" is a current commutation method that switches the input phase voltage to be output to each output phase in two steps. In this two-step voltage commutation method, before and after the commutation operation, both uni-directional switches Sio and Soi of the bidirectional switch S corresponding to the input phase voltage to be output the output phase are in on-state. Furthermore, before and after the commutation operation, one of the uni-directional switches alone in the remaining bidirectional switch S is in on-state. FIG. 20 is a diagram corresponding to FIG. 8, and a diagram illustrating a relationship between the output phase voltage Vu, the gate signals S1$u$ to S6$u$, and the respective steps of the commutation operation in the two-step voltage commutation method.

Thus, the matrix converter 1 allows any setting of the first and second commutation methods on the condition that the electric-current-polarity dependency of the first commutation method is higher than the electric-current-polarity dependency of the second commutation method. This allows setting the commutation method corresponding to the installation environment and the use of the matrix converter 1. As a result, the accuracy of the output voltage Vo can be improved.

Here, in the above-described embodiment, the selector 43 selects the commutation controller that performs the commutation control based on the output electric current phase θo. This, however, should not be construed in a limiting sense. The selector 43 may select the commutation controller corresponding to the output electric current phase θo as a result. For example, the selector 43 may shift the threshold phase ranges θuref, θvref, and θwref by the phase corresponding to a power factor λo of electric power to be output from the power converter 10. Subsequently, the selector 43 may compare these threshold phase ranges θuref, θvref, and θwref with the phase of the output voltage Vo.

(2. Second Embodiment)

The following describes a matrix converter according to a second embodiment. The matrix converter according to the second embodiment differs from the matrix converter 1 according to the first embodiment in that the matrix converter selects the commutation controller based on the input voltage phase. In the following description, the difference from the matrix converter 1 according to the first embodiment will be mainly described. Like reference numerals designate elements with corresponding or identical functions of the first embodiment, and therefore such elements will not be further elaborated here.

Figure 21:
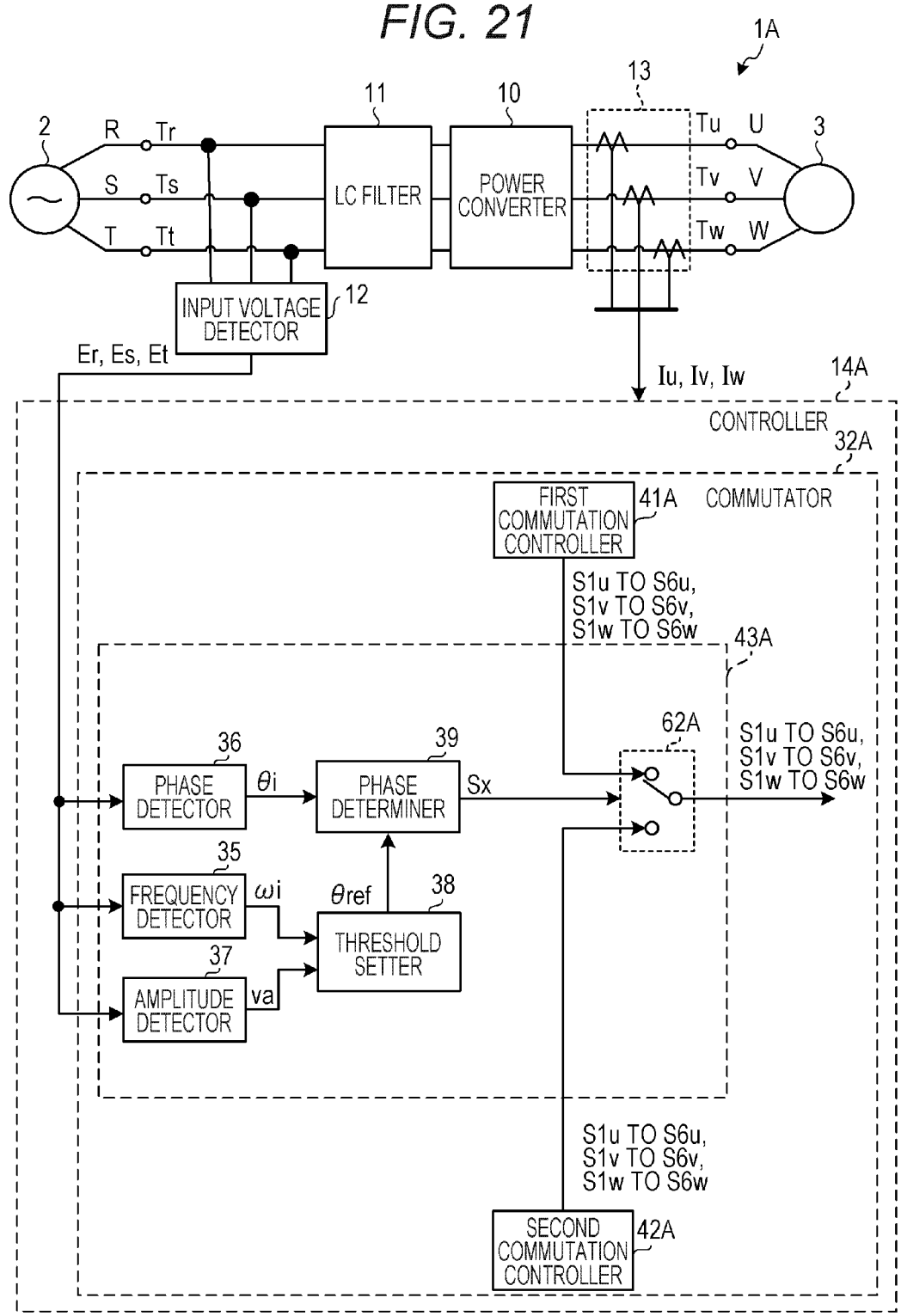
FIG. 21 is a diagram illustrating an exemplary configuration of a matrix converter according to a second embodiment.

FIG. 21 is a diagram illustrating an exemplary configuration of a matrix converter 1A according to the second embodiment. As illustrated in FIG. 21, the matrix converter 1A according to the second embodiment includes the power converter 10, the LC filter 11, the input voltage detector 12, the output electric current detector 13, and a controller 14A.

The controller 14A includes the voltage command operator 30 (see FIG. 3), the PWM-duty-ratio operator 31 (see FIG. 3), and a commutator 32A. The commutator 32A includes a first commutation controller 41A, a second commutation controller 42A, and a selector 43A.

The first commutation controller 41A performs a commutation control with a first commutation method. The first commutation method is a commutation method in which the dependency on the magnitude relationship between the input phase voltages Er, Es, and Et is relatively high compared with a second commutation method. This first commutation method is, for example, the four-step voltage commutation method described in the first embodiment. This first commutation method is the commutation method in which the short circuit duration between the phases for the input phase during the commutation operation becomes relatively long at the time of a mistake on the magnitude relationship between the input phase voltages Er, Es, and Et.

The second commutation controller 42A performs a commutation control with a second commutation method. The second commutation method is a commutation method in which the dependency on the magnitude relationship between the input phase voltages Er, Es, and Et is relatively low compared with the first commutation method. This second commutation method is, for example, the four-step current commutation method described in the first embodiment. This second commutation method is the commutation method in which the short circuit duration between the phases for the input phase during the commutation operation becomes relatively short at the time of a mistake on the magnitude relationship between the input phase voltages Er, Es, and Et.

The selector 43A selects the commutation controller that performs the commutation control from the first and second commutation controllers 41A and 42A based on a phase $\theta i$ (hereinafter referred to as the input voltage phase $\theta i$) of the input voltage Vi.

Figure 22:
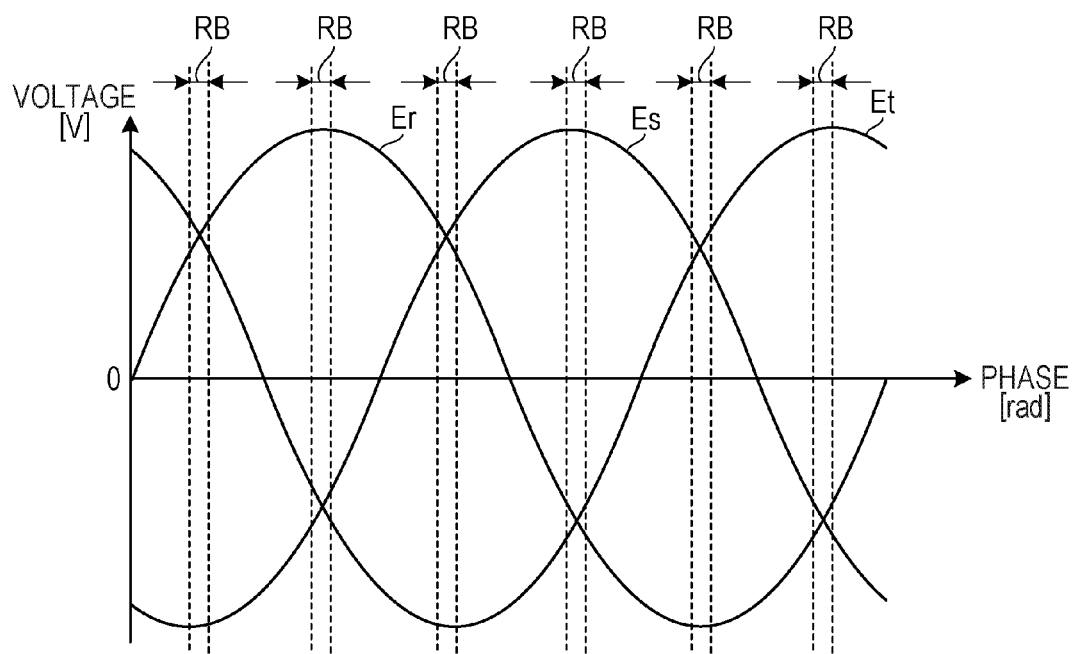
FIG. 22 is a diagram illustrating a relationship between magnitudes of input phase voltages and input voltage phases of an R-phase, an S-phase, and a T-phase.

The first commutation method has the relatively high dependency on the magnitude relationship between the input phase voltages Er, Es, and Et. Accordingly, the first commutation method is susceptible to the detection sensitivity and the detection noise of the input voltage detector 12 and similar cause. FIG. 22 is a diagram illustrating a relationship between the magnitude relationship between the input phase voltages Er, Es, and Et and the input voltage phases of the R-phase, the S-phase, and the T-phase. In a region RB illustrated in FIG. 22, the difference of the magnitude relationship between the input phase voltages Er, Es, and Et is small. Accordingly, a detection error of the input voltage or similar error might cause a mistake on the magnitude relationship between the input phase voltages Er, Es, and Et, thus causing a short circuit between the phases for the input phase. In the case where a short circuit between the phases for the input phase occurs, a voltage drop between the input phases occurs. This reduces the accuracy of the output voltage Vo.

On the other hand, in the second commutation method, the dependency on the difference (the difference between the absolute values of the input phase voltages Er, Es, and Et) of the magnitude relationship between the input phase voltages Er, Es, and Et is relatively low. Accordingly, the second commutation method is insusceptible to the detection sensitivity and the detection noise of the input voltage detector 12 and similar cause compared with the first commutation method. Therefore, the selector 43A selects the second commutation controller 42A in the region (the region where the difference between the absolute values of the input voltages is smaller than a predetermined threshold (a second threshold)) where the difference of the magnitude relationship between the input phase voltages Er, Es, and Et is small like the region RB where the commutation failure might occur in the first commutation method, and causes the second commutation controller 42A to execute the commutation control with the second commutation method.

The selector 43A makes a determination of the region where the commutation failure might occur in the first commutation method based not on the absolute values of the input phase voltages Er, Es, and Et but on the input voltage phase $\theta i$. Specifically, the selector 43A selects the first commutation controller 41A in the case where the input voltage phase $\theta i$ is out of a predetermined range, and selects the second commutation controller 42A in the case where the input voltage phase $\theta i$ is within the predetermined range. Here, the predetermined range of the input voltage phase $\theta i$ is, for example, the range of the input voltage phase $\theta i$ where the difference between the absolute values of the input phase voltages Er, Es, and Et is smaller than the predetermined threshold (the second threshold).

As illustrated in FIG. 21, the selector 43A includes a frequency detector 35, a phase detector 36, a amplitude detector 37, a threshold setter 38, a phase determiner 39, and a switcher 62A.

The frequency detector 35 detects a frequency $\omega i$ (hereinafter referred to as the input voltage frequency $\omega i$) of the input voltage Vi based on the input phase voltages Er, Es, and Et detected by the input voltage detector 12. The frequency detector 35 has, for example, a phase locked loop (PLL) and similar member.

The phase detector 36 detects a phase $\theta i$ (hereinafter referred to as the input voltage phase $\theta i$) of the input voltage Vi based on the input phase voltages Er, Es, and Et. The phase detector 36 has, for example, a PLL, an integrator, and similar member. Here, the phase detector 36 can also detect the input voltage phase $\theta i$ by, for example, integrating the input voltage frequency of from the frequency detector 35.

The amplitude detector 37 detects an amplitude va (hereinafter referred to as the input voltage amplitude va) of the input voltage Vi based on the input phase voltages Er, Es, and Et.

Figure 23:
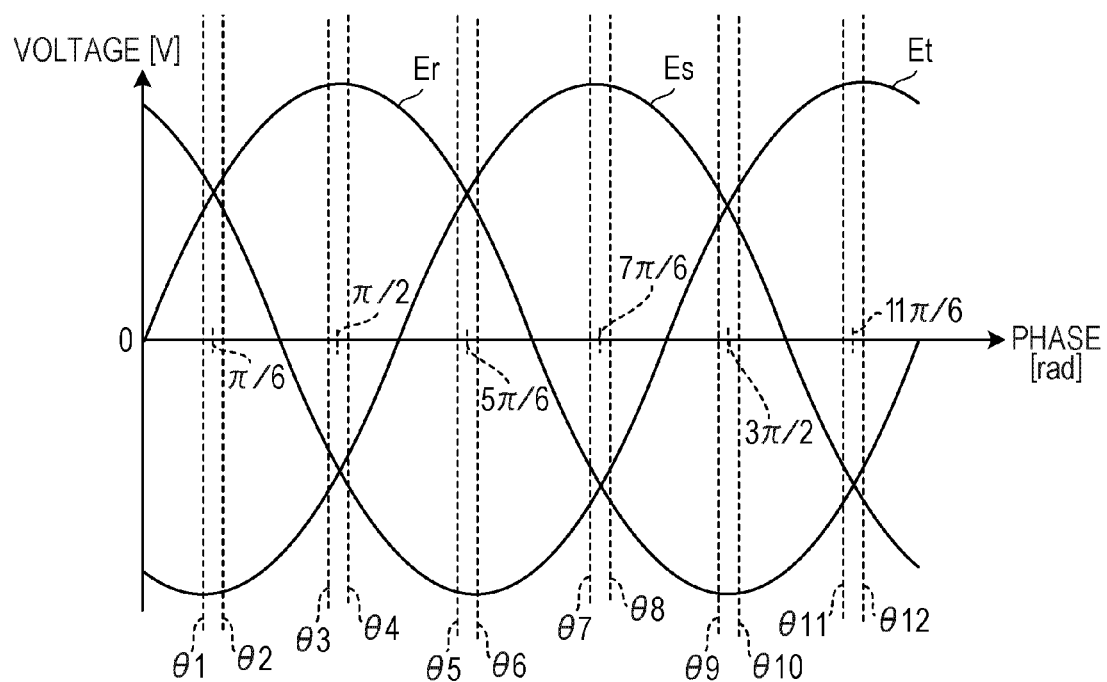
FIG. 23 is a diagram illustrating an exemplary threshold phase range.

The threshold setter 38 generates a threshold phase range $\theta ref$ corresponding to a parameter Pa ($=1$ or 2), and outputs this range to the U-phase determiner 50. FIG. 23 is a diagram illustrating one example of the threshold phase range $\theta ref$. As illustrated in FIG. 23, the threshold setter 38 sets the respective ranges of $\theta 1$ to $\theta 2$, $\theta 3$ to $\theta 4$, $\theta 5$ to $\theta 6$, $\theta 7$ to $\theta 8$, $\theta 9$ to $\theta 10$, and $\theta 11$ to $\theta 12$ as the threshold phase range $\theta ref$.

In the case where Pa=1, the threshold setter 38 sets, for example, $(2m-1) \times \pi/6 - K1 \times \omega i/va$ to $(2m-1) \times \pi/6 + K2 \times \omega i/va$ (m=1 to 6) as the threshold phase range $\theta ref$ based on the input voltage frequency $\omega i$ and the input voltage amplitude va. In the case where Pa=2, the threshold setter 38 sets $(2m-1) \times \pi/6 - K1/va$ to $(2m-1) \times \pi/6 + K2/va$ as the threshold phase range $\theta ref$ based on the input voltage amplitude va. Here, in the case where $\omega o$ is positive, the coefficients K1 and K2 are set to satisfy K1>K2. In the case where $\omega o$ is negative, the coefficients K1 and K2 are set to satisfy K1<K2.

The phase determiner 39 outputs a selection signal Sx for selecting the commutation controller that performs the commutation control of the U-phase, the V-phase, and the W-phase from the first and second commutation controllers 41A and 42A based on the input voltage phase $\theta i$ and the threshold phase range $\theta ref$.

Specifically, the phase determiner 39 outputs the selection signal Sx at High level in the case where the input voltage phase $\theta i$ is out of the threshold phase range $\theta ref$. The phase determiner 39 outputs the selection signal Sx at Low level in the case where the output electric current phase $\theta o$ is within the threshold phase range $\theta ref$.

The switcher 62A outputs the gate signals S1u to S6u, S1v to S6v, and S1w to S6w output from the first commutation controller 41A in the case where the selection signal Sx is at High level. On the other hand, the switcher 62A outputs the gate signals S1u to S6u, S1v to S6v, and S1w to S6w output from the second commutation controller 42A in the case where the selection signal Sx is at Low level.

The input voltage phase $\theta_i$ is insusceptible to the detection error and the detection noise of the output electric current detector 13 compared with the input phase voltages Er, Es, and Et themselves. Accordingly, using the input voltage phase $\theta_i$ improves the accuracy of the switching determination of the commutation method.

The threshold phase range $\theta_{ref}$ is adjusted corresponding to the input voltage amplitude va. Accordingly, using the threshold phase range $\theta_{ref}$ allows improving the accuracy of the output voltage Vo similarly to the U-phase threshold phase range $\theta_{uref}$ or similar parameter in the first embodiment. That is, in the case where the input phase voltages Er, Es, and Et are within the region RB (see FIG. 22), the second commutation method can be accurately selected. On the other hand, this allows reducing the possibility that the second commutation method is selected in the case where the input phase voltages Er, Es, and Et are out of the region RB. Accordingly, the accuracy of the output voltage Vo can be improved.

In the case where the input voltage frequency $\omega_i$ is positive, K1 >K2 is satisfied. In the case where the input voltage frequency $\omega_i$ is negative, K1 <K2 is satisfied. Accordingly, the delay of switching of the switching pattern corresponding to the magnitude relationship between the input phase voltages Er, Es, and Et can be compensated.

In the case where Pa=1, the threshold phase range $\theta_{ref}$ is adjusted based on the input voltage frequency $\omega_i$. When the input voltage frequency $\omega_i$ is high, in the case where the input phase voltages Er, Es, and Et are in the region RB, the number of selections of the commutation method is reduced. Therefore, the threshold setter 38 sets the threshold phase range $\theta_{ref}$ such that the threshold phase range $\theta_{ref}$ becomes wider as the input voltage frequency $\omega_i$ becomes higher. This reduces the situation that the number of selections of the commutation method becomes extremely small in the case where the input phase voltages Er, Es, and Et are in the region RB. Here, the threshold setter 38 can also adjust the threshold phase range $\theta_{ref}$ based on the input voltage frequency $\omega_i$ in the case where the input voltage frequency $\omega_i$ is equal to or more than a predetermined value.

As described above, in the matrix converter 1A according to the second embodiment, the commutation controller that executes the commutation control is selected from the first and second commutation controllers 41A and 42A based on the input voltage phase $\theta_i$. This allows improving the switching accuracy of the commutation method. Improving the switching accuracy of the commutation method allows suppressing occurrence of a voltage drop between the input phases. This consequently allows suppressing failure of the power converter 10 without disposing a switching element with a large size and a large capacity or similar element. Thus, this allows ensuring the downsized, highly-efficient, and low-cost matrix converter 1A.

In the above description, the first commutation method employs the four-step voltage commutation method as the example and the second commutation method employs the four-step current commutation method as the example. However, the combination of the first commutation method and the second commutation method is not limited to the above-described combination.

That is, similarly to the first embodiment, the first commutation method and the second commutation method can be selected from the plurality of commutation methods as illustrated in FIG. 14. In this case, as the first commutation method, the commutation method in which the dependency on the magnitude relationship between the input phase voltages Er, Es, and Et is relatively high is selected. Furthermore, as the second commutation method, the commutation method in which the dependency on the magnitude relationship between the input phase voltages Er, Es, and Et is relatively low is selected.

Similarly to the first embodiment, the first commutation controller 41A stores the parameter Ps1 indicative of the type of the first commutation method in a storage inside. The first commutation controller 41A performs the commutation control with the commutation method corresponding to the parameter Ps1. The second commutation controller 42A stores the parameter Ps2 indicative of the type of the second commutation method in a storage inside. The second commutation controller 42A performs the commutation control with the commutation method corresponding to the parameter Ps2.

In the above-described embodiment, the selector 43A selects the commutation controller that performs the commutation control based on the input voltage phase $\theta_i$. This, however, should not be construed in a limiting sense. The selector 43A may select the commutation controller corresponding to the input voltage phase $\theta_i$ as a result. For example, the selector 43A may shift the threshold phase range $\theta_{ref}$ by the phase corresponding to a power factor $\lambda_i$ of electric power to be input to the power converter 10. Subsequently, the selector 43A may compare the threshold phase range $\theta_{ref}$ with the phase of an input electric current Ii.

(3. Third Embodiment)

The following describes a matrix converter according to a third embodiment. The matrix converter according to the third embodiment differs from the matrix converters 1 and 1A according to the first and second embodiments in that the matrix converter selects the commutation controller based on the output electric current phase $\theta_o$ and the input voltage phase $\theta_i$. Here, in the following description, the difference from the matrix converters 1 and 1A according to the first and second embodiments will be mainly described. Like reference numerals designate elements with corresponding or identical functions of the first embodiment, and therefore such elements will not be further elaborated here.

Figure 24:
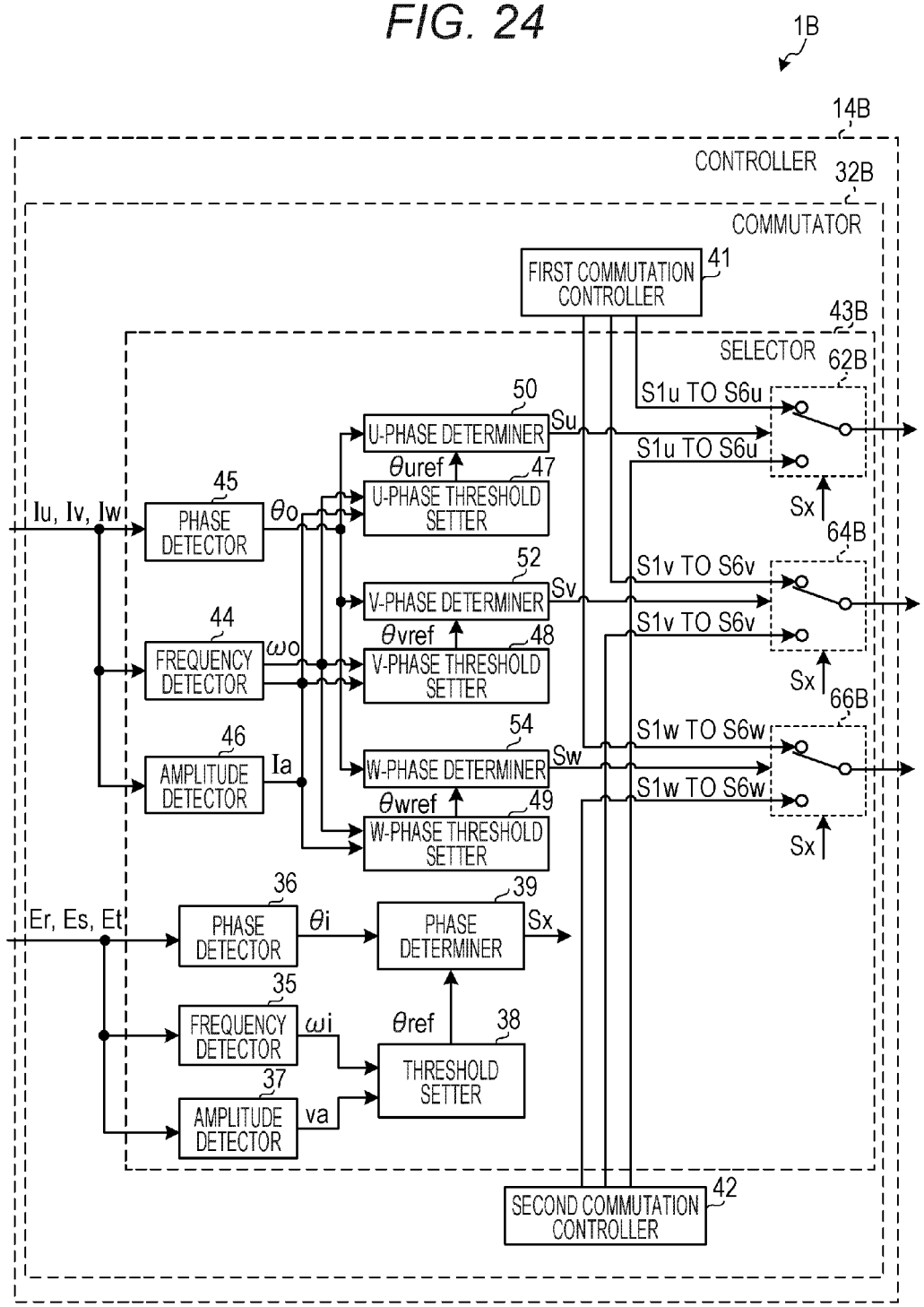
FIG. 24 is a diagram illustrating an exemplary configuration of a matrix converter according to a third embodiment.

FIG. 24 is a diagram illustrating an exemplary configuration of a matrix converter 1B according to the third embodiment. As illustrated in FIG. 24, the matrix converter 1B according to the third embodiment includes a controller 14B. Here, the matrix converter 1B includes the power converter 10, the LC filter 11, the input voltage detector 12, the output electric current detector 13, and similar member (see FIG. 1 or FIG. 21).

The controller 14B includes the voltage command operator 30 (see FIG. 3), the PWM-duty-ratio operator 31 (see FIG. 3), and a commutator 32B. The commutator 32B includes the first commutation controller 41, the second commutation controller 42, and a selector 43B.

Similarly to the selector 43, the selector 43B includes the frequency detector 44, the phase detector 45, the amplitude detector 46, the U-phase threshold setter 47, the V-phase threshold setter 48, the W-phase threshold setter 49, the U-phase determiner 50, the V-phase determiner 52, and the W-phase determiner 54. Similarly to the selector 43, the selector 43B generates the U-phase selection signal Su, the V-phase selection signal Sv, and the W-phase selection signal Sw corresponding to the output electric current phase $\theta_o$.

Similarly to the selector 43A, the selector 43B includes the frequency detector 35, the phase detector 36, the amplitude detector 37, the threshold setter 38, and the phase determiner 39. Similarly to the selector 43A, the selector 43B generates the selection signal Sx corresponding to the input voltage phase θi.

A parameter Pm (=1 or 2) is set to each of a U-phase switcher 62B, a V-phase switcher 64B, and a W-phase switcher 66B. The parameter Pm is set, for example, by the installation personnel of the matrix converter 1B or similar person through an input unit (not illustrated).

In the case where Pm=1, when the U-phase selection signal Su is the signal at High level, the U-phase switcher 62B selects the first commutation controller 41. On the other hand, when the U-phase selection signal Su is the signal at Low level, the U-phase switcher 62B selects the second commutation controller 42 only in the case where the selection signal Sx is the signal at High level. Accordingly, in the case where the output electric current Io is within the region RA (see FIG. 10) and the input phase voltages Er, Es, and Et are within the region RB (see FIG. 22), a short circuit between the phases for the input phase has a higher priority than circuit opening of the output phase. This allows reducing the commutation failure.

In the case where Pm=2, when the selection signal Sx is the signal at High, the U-phase switcher 62B selects the second commutation controller 42. On the other hand, when the selection signal Sx is the signal at Low level, the U-phase switcher 62B selects the first commutation controller 41 only in the case where the U-phase selection signal Su is at High level. Accordingly, in the case where the output electric current Io is within the region RA and the input phase voltages Er, Es, and Et are within the region RB, circuit opening of the output phase has a higher priority than a short circuit between the phases for the input phase. This allows reducing the commutation failure.

With a similar process to that of the U-phase switcher 62B, the V-phase switcher 64B selects the commutation controller that executes the commutation control from the first and second commutation controllers 41 and 42 corresponding to the setting of the parameter Pm based on the V-phase selection signal Sv and the selection signal Sx.

With a similar process to that of the U-phase switcher 62B, the W-phase switcher 66B selects the commutation controller that executes the commutation control from the first and second commutation controllers 41 and 42 corresponding to the setting of the parameter Pm based on the W-phase selection signal Sw and the selection signal Sx.

As described above, in the matrix converter 1B according to the third embodiment, the commutation controller that executes the commutation control is selected from the first and second commutation controllers 41 and 42 based on the output electric current phase θo and the input voltage phase θi. Accordingly, in the case where the output electric current Io is within the region RA and the input phase voltages Er, Es, and Et are within the region RB, this allows preferentially suppressing one of a short circuit between the input phases and circuit opening of the output phase.

Here, the power converter 10 is exemplary power conversion means. The controllers 14, 14A, and 14B are examples of control means.

The matrix converter according to one embodiment of this disclosure may be the following first to fifth matrix converters.

The first matrix converter includes a power converter and a controller. The power converter includes a plurality of bidirectional switches configured to control a conducting direction using a plurality of switching elements. The plurality of bidirectional switches are disposed between a plurality of input terminals to be coupled to respective phases of an AC power supply and a plurality of output terminals to be coupled to respective phases of a load. The controller is configured to control the plurality of bidirectional switches. The controller includes a first commutation controller, a second commutation controller, and a selector. The first commutation controller is configured to perform a commutation control with a first commutation method. The second commutation controller is configured to perform a commutation control with a second commutation method different from the first commutation method. The selector is configured to select a commutation controller that is configured to execute a commutation control from the first commutation controller and the second commutation controller based on a phase of an output electric current from the power converter or a phase of an input voltage to the power converter.

In the second matrix converter according to the first matrix converter, the selector is configured to: select the first commutation controller in a case where the phase of the output electric current or the phase of the input voltage is out of a predetermined range; and select the second commutation controller in a case where the phase of the output electric current or the phase of the input voltage is within the predetermined range.

In a third matrix converter according to the second matrix converter, the selector is configured to change the predetermined range based on a frequency of the output electric current or a frequency of the input voltage.

In a fourth matrix converter according to the second matrix converter, the selector is configured to change the predetermined range based on an amplitude of the output electric current or an amplitude of the input voltage.

In a fifth matrix converter according to any of the first to fourth matrix converters, the first commutation controller is configured to perform a commutation control with a commutation method in which dependency on a polarity of the output electric current is relatively high. The second commutation controller is configured to perform a commutation control with a commutation method in which the dependency on the polarity of the output electric current is relatively low.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general concept of the disclosure as defined by the appended claims and their equivalents.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A matrix converter, comprising:
   a power convertor that includes a plurality of bidirectional switches disposed between a plurality of input terminals and a plurality of output terminals, the input terminals being to be coupled to respective phases of an AC power supply, the output terminals being to be coupled to respective phases of a load, the bidirectional switch being configured to control a conducting direction using a plurality of switching elements; and a controller configured to control the plurality of bidirectional switches, wherein the controller includes:
- a first commutation controller configured to perform a commutation control with a first commutation method;
- a second commutation controller configured to perform a commutation control with a second commutation method different from the first commutation method; and
- a selector configured to select a commutation controller that is configured to execute a commutation control from the first commutation controller and the second commutation controller based on any one of a phase of an output electric current from the power convertor and a phase of an input voltage to the power convertor, wherein the selector is configured to select a commutation controller that is configured to execute a commutation control from the first commutation controller and the second commutation controller based on the phase of the output electric current from the power convertor, and the selector is configured to:
- select the first commutation controller in a case where the phase of the output electric current is out of a predetermined range; and
- select the second commutation controller in a case where the phase of the output electric current is within the predetermined range.

2. The matrix converter according to claim 1, wherein the selector is configured to change the predetermined range based on a frequency of the output electric current.

3. The matrix converter according to claim 1, wherein the selector is configured to change the predetermined range based on an amplitude of the output electric current.

4. The matrix converter according to claim 1, wherein the first commutation controller is configured to perform a commutation control with a commutation method in which dependency on a polarity of the output electric current is relatively high, and
the second commutation controller is configured to perform a commutation control with a commutation method in which the dependency on the polarity of the output electric current is relatively low.

5. The matrix converter according to claim 4, wherein the predetermined range of the phase of the output electric current is a range of the phase of the output electric current in which an absolute value of the output electric current is smaller than a predetermined threshold.

6. A matrix converter
a power convertor that includes a plurality of bidirectional switches disposed between a plurality of input terminals and a plurality of output terminals, the input terminals being to be coupled to respective phases of an AC power supply, the output terminals being to be coupled to respective phases of a load, the bidirectional switch being configured to control a conducting direction using a plurality of switching elements; and a controller configured to control the plurality of bidirectional switches, wherein the controller includes:
- a first commutation controller configured to perform a commutation control with a first commutation method;
- a second commutation controller configured to perform a commutation control with a second commutation method different from the first commutation method; and
- a selector configured to select a commutation controller that is configured to execute a commutation control from the first commutation controller and the second commutation controller based on any one of a phase of an output electric current from the power convertor and a phase of an input voltage to the power convertor, wherein the selector is configured to select a commutation controller that is configured to execute a commutation control from the first commutation controller and the second commutation controller based on the phase of the input voltage to the power convertor, and the selector is configured to:
- select the first commutation controller in a case where the phase of the input voltage is out of a predetermined range; and
- select the second commutation controller in a case where the phase of the input voltage is within the predetermined range.

7. The matrix converter according to claim 6, wherein the selector is configured to change the predetermined range based on a frequency of the input voltage.

8. The matrix converter according to claim 6, wherein the selector is configured to change the predetermined range based on an amplitude of the input voltage.

9. The matrix converter according to claim 6, wherein the first commutation controller is configured to perform a commutation control with a commutation method in which dependency on a difference in absolute value of the input voltage is relatively high, and
the second commutation controller is configured to perform a commutation control with a commutation method in which the dependency on the difference in absolute value of the input voltage is relatively low.

10. The matrix converter according to claim 9, wherein the predetermined range of the phase of the input voltage is a range of the phase of the input voltage in which a difference in absolute value of the input voltage is smaller than a predetermined threshold.

* * * * *